United States Patent
Gao et al.

(10) Patent No.: US 12,401,458 B2
(45) Date of Patent: Aug. 26, 2025

(54) METHOD, DEVICE AND COMPUTER STORAGE MEDIUM FOR COMMUNICATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 148 days.

(21) Appl. No.: 18/029,156

(22) PCT Filed: Sep. 30, 2020

(86) PCT No.: PCT/CN2020/119423
§ 371 (c)(1),
(2) Date: Mar. 29, 2023

(87) PCT Pub. No.: WO2022/067677
PCT Pub. Date: Apr. 7, 2022

(65) Prior Publication Data
US 2023/0388058 A1  Nov. 30, 2023

(51) Int. Cl.
*H04L 1/18* (2023.01)
*H04L 1/1812* (2023.01)
(Continued)

(52) U.S. Cl.
CPC .......... *H04L 1/1812* (2013.01); *H04L 1/1861* (2013.01); *H04L 5/0055* (2013.01); *H04W 72/23* (2023.01)

(58) Field of Classification Search
CPC ............... H04L 1/1812; H04L 1/1861; H04L 5/0055; H04W 72/23
See application file for complete search history.

(56) References Cited

U.S. PATENT DOCUMENTS

| | | |
|---|---|---|
| 2019/0045489 A1 | 2/2019 | He et al. |
| 2020/0337077 A1* | 10/2020 | Yoshimura ............ H04L 1/1864 |

(Continued)

FOREIGN PATENT DOCUMENTS

| | | |
|---|---|---|
| CN | 110536451 A | 12/2019 |
| CN | 110876204 A | 3/2020 |

(Continued)

OTHER PUBLICATIONS

Wilus Inc., "Remaining issues on PUCCH", 3GPP TSG RAN WG1 Meeting #94bis, Chengdu, China, Oct. 8-12, 2018, R1-1811450 (13 pages).

(Continued)

*Primary Examiner* — Esaw T Abraham
(74) *Attorney, Agent, or Firm* — Sughrue Mion, PLLC

(57) ABSTRACT

Embodiments of the present disclosure relate to methods, devices and computer storage media for communication. A method comprises transmitting, from a network device to a terminal device, downlink control information (DCI) over a first set of Physical Downlink Control Channel (PDCCH) candidates for scheduling a Physical Downlink Shared Channel (PDSCH), where the DCI includes at least one of a counter downlink assignment indicator (DAI) value and a total DAI value; transmitting the PDSCH from the network device to the terminal device; and receiving a hybrid automatic repeat request acknowledgement (HARQ-ACK) codebook for the PDSCH from the terminal device, where the HARQ-ACK codebook is generated at least based on a first configuration of a second set of PDCCH candidates, and at least one of the counter DAI value and the total DAI value. As such, the dynamic HARQ-ACK codebook can be obtained without introducing additional signaling overhead.

20 Claims, 16 Drawing Sheets

(51) Int. Cl.
*H04L 1/1829* (2023.01)
*H04L 5/00* (2006.01)
*H04W 72/23* (2023.01)

(56) References Cited

U.S. PATENT DOCUMENTS

| | | | |
|---|---|---|---|
| 2020/0359401 A1* | 11/2020 | Yoshimura | H04L 1/1819 |
| 2021/0195620 A1* | 6/2021 | Yoshimura | H04W 72/1273 |
| 2021/0314094 A1 | 10/2021 | Gao | |
| 2021/0368528 A1* | 11/2021 | Yoshimura | H04W 72/1273 |
| 2022/0240187 A1* | 7/2022 | Guo | H04W 52/0229 |
| 2023/0090986 A1* | 3/2023 | Jang | H04L 5/0048 |
| | | | 370/329 |

FOREIGN PATENT DOCUMENTS

| | | |
|---|---|---|
| EP | 3 413 646 A1 | 12/2018 |
| WO | 2020/057566 A1 | 3/2020 |
| WO | 2020/065626 A1 | 4/2020 |

OTHER PUBLICATIONS

Nokia, et al., "Remaining details on search space", 3GPP TSG RAN WG1 #92bis, Sanya, China, Apr. 16-20, 2018, R1-1805517 (14 pages).

Qualcomm Incorporated, "Summary #1 of email discussion [102-e-NR-feMIMO-02]", 3GPP TSG RAN WG1 Meeting #102-e, e-meeting, Aug. 17-28, 2020, R1-2007180 (63 pages).

Extended European Search Report issued Oct. 4, 2023 in Application No. 20955702.4.

JP Office Action for Japanese Patent Application No. 2023-519784, mailed on Sep. 3, 2024 with English Translation.

Caict, "Potential enhancements to PDCCH for URLLC", 3GPP TSG RAN WG1 adhoc_NR_AH_1901 R1-1901129, Jan. 21, 2019.

Ericsson, "On PDCCH, PUCCH and PUSCH enhancements", 3GPP TSG RAN WG1 #104-e R1-2101654, Jan. 26, 2021.

Nokia, Nokia Shanghai Bell, "Enhancements for Multi-TRP URLLC schemes", 3GPP TSG RAN WG1 #104-e R1-2101006, Jan. 25, 2021.

Nec, "Discussion on multi-TRP for PDCCH, PUCCH and PUSCH", 3GPP TSG RAN WG1 #104-e R1-2100950, Jan. 25, 2021.

NTT Docomo, Inc, "Enhancements on multi-TRP/panel transmission", 3GPP TSG RAN WG1 #98bis R1-1911184, Oct. 14-20, 2019, pp. 1-13, Chongqing, China.

LG Electronics, "Discussion on PDCCH repetition for URLLC", 3GPP TSG RAN WG1 Meeting #92 R1-1802227, February 26-Mar. 2, 2018, pp. 1-4, Athens, Greece.

International Search Report of PCT/CN2020/119423 dated Jul. 8, 2021 [PCT/ISA/210].

Written Opinion of PCT/CN2020/119423 dated Jul. 8, 2021 [PCT/ISA/237].

Chinese Office Action for CN Application No. 202080105743.9 mailed on Nov. 23, 2024 with English Translation.

Li Xiaowen, Luo Jia, Research and Implementation on UE of PDCCH in TD-LTE System, Oct. 2, 2013.

Spreadtrum Communications, Remaining issues on HARQ-ACK codebook, 3GPP TSG RAN WG1 Meeting #92b, R1-1804227, Apr. 6, 2018.

* cited by examiner

METHOD, DEVICE AND COMPUTER STORAGE MEDIUM FOR COMMUNICATION

CROSS REFERENCE TO RELATED APPLICATIONS

This application is a National Stage of International Application No. PCT/CN2020/119423, filed Sep. 30, 2020.

TECHNICAL FIELD

Embodiments of the present disclosure generally relate to the field of telecommunication, and in particular, to methods, devices and computer storage media for communication.

BACKGROUND

In the 3GPP meeting RAN #86, enhancements on the support for multi-Transmission and Reception Point (multi-TRP) deployment have been discussed. For example, it has been proposed to identify and specify features to improve reliability and robustness for physical channels (such as, Physical Downlink Control Channel (PDCCH), Physical Uplink Shared Channel (PUSCH) and/or Physical Uplink Control Channel (PUCCH)) other than Physical Downlink Shared Channel (PDSCH) using multi-TRP and/or multi-panel with Release 16 reliability features as a baseline. It has also been proposed to identify and specify features to enable inter-cell multi-TRP operations. It has also been proposed to evaluate and specify enhancements for simultaneous multi-TRP transmissions with multi-panel receptions.

In the 3GPP meeting RAN1 #98-99, it has been proposed to support Physical Downlink Control Channel (PDCCH) repetitions to improve reliability and robustness for the PDCCH. That is, downlink control information (DCI) can be repeatedly transmitted from a network device to a terminal device more than once, so as to improve reliability and robustness for the PDCCH. If PDCCH repetitions are enabled, it is required to ensure the same DCI payload for the PDCCH repetitions.

SUMMARY

In general, example embodiments of the present disclosure provide methods, devices and computer storage media for communication.

In a first aspect, there is provided a method of communication. The method comprises transmitting, from a network device to a terminal device, downlink control information (DCI) over a first set of Physical Downlink Control Channel (PDCCH) candidates for scheduling a Physical Downlink Shared Channel (PDSCH), wherein the DCI includes at least one of a counter downlink assignment indicator (DAI) value and a total DAI value; transmitting the PDSCH from the network device to the terminal device; and receiving a hybrid automatic repeat request acknowledgement (HARQ-ACK) codebook for the PDSCH from the terminal device, wherein the HARQ-ACK codebook is generated at least based on a first configuration of a second set of PDCCH candidates, and at least one of the counter DAI value and the total DAI value.

In a second aspect, there is provided a method of communication. The method comprises detecting, from a network device and at a terminal device, downlink control information (DCI) over a first set of Physical Downlink Control Channel (PDCCH) candidates for scheduling a Physical Downlink Shared Channel (PDSCH), wherein the DCI includes at least one of a counter downlink assignment indicator (DAI) value and a total DAI value; in response to the DCI being detected over the first set of PDCCH candidates, receiving the PDSCH transmitted from the network device; generating a hybrid automatic repeat request acknowledgement (HARQ-ACK) codebook for the PDSCH, based on a first configuration of a second set of PDCCH candidates, and at least one of the counter DAI value and the total DAI value; and transmitting the HARQ-ACK codebook to the network device.

In a third aspect, there is provided a method of communication. The method comprises transmitting, from a network device to a terminal device, downlink control information (DCI) over a first set of Physical Downlink Control Channel (PDCCH) candidates for scheduling a communication between the network device and the terminal device, wherein the DCI includes at least one of offset information for the communication and first timing information for the communication; and performing the communication with the terminal device based on second timing information, wherein the second timing information is determined based on a time interval between the first set of PDCCH candidates and a second set of PDCCH candidates and at least one of a first configuration of the second set of PDCCH candidates, third timing information corresponding to the DCI over the second set of PDCCH candidates, the offset information, and the first timing information.

In a fourth aspect, there is provided a method of communication. The method comprises detecting, from a network device and at a terminal device, downlink control information (DCI) over a first set of Physical Downlink Control Channel (PDCCH) candidates for scheduling a communication between the network device and the terminal device, wherein the DCI includes at least one of offset information for the communication and first timing information for the communication; and in response to the DCI being detected over the first set of PDCCH candidates, performing the communication with the network device based on second timing information, wherein the second timing information is determined based on a time interval between the first set of PDCCH candidates and a second set of PDCCH candidates and at least one of a first configuration of the second set of PDCCH candidates, third timing information corresponding to the DCI over the second set of PDCCH candidates, the offset information, and the first timing information.

In a fifth aspect, there is provided a network device. The network device comprises a processor and a memory coupled to the processor. The memory stores instructions that when executed by the processor, cause the network device to perform the method according to the first or third aspect of the present disclosure.

In a sixth aspect, there is provided a terminal device. The terminal device comprises a processor and a memory coupled to the processor. The memory stores instructions that when executed by the processor, cause the terminal device to perform the method according to the second or fourth aspect of the present disclosure.

In a seventh aspect, there is provided a computer readable medium having instructions stored thereon. The instructions, when executed on at least one processor, cause the at least one processor to perform the method according to the above first, second, third or fourth aspect of the present disclosure.

In an eighth aspect, there is provided a computer program product that is stored on a computer readable medium and includes machine-executable instructions. The machine-executable instructions, when being executed, cause a machine to perform the method according to the above first, second, third or fourth aspect of the present disclosure.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
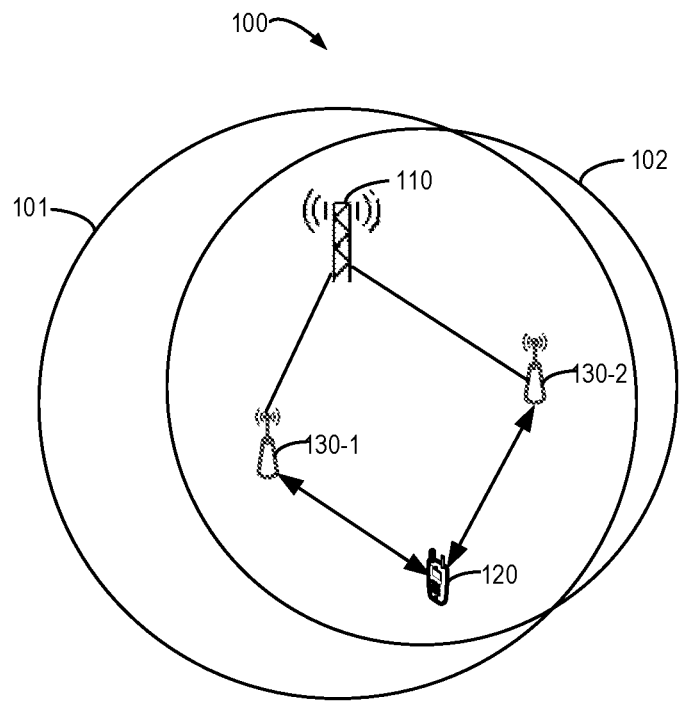
FIG. 1 illustrates an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'some embodiments' and 'an embodiment' are to be read as 'at least some embodiments.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As described above, in the 3GPP meeting RAN1 #98-99, it has been proposed to support PDCCH repetitions to improve reliability and robustness for the PDCCH. That is, DCI can be repeatedly transmitted from a network device to a terminal device more than once, so as to improve reliability and robustness for the PDCCH.

Typically, a DCI format has a DAI field. The DAI field may include 1 or 2 bits to indicate a counter DAI value and/or further include 2 bits to indicate a total DAI value. For example, if dynamic HARQ-ACK codebook is configured, the DAI field may only include 1 or 2 bits to indicate a counter DAI value. For example, the DCI format may be DCI format 1_0 or DCI format 1_2. The counter DAI value in the DCI format denotes the accumulative number of {serving cell, PDCCH monitoring occasion} pair(s) in which PDSCH repetition(s) or Sounding Reference Signal (SRS) PDSCH release associated with the DCI format is present up to the current serving cell and current PDCCH monitoring occasion, first in ascending order of serving cell index and then in ascending order of PDCCH monitoring occasion index. For example, the counter DAI value can be any of {1, 2, 3, 4}. The total DAI value in the DCI format denotes the total number of {serving cell, PDCCH monitoring occasion} pair(s) in which PDSCH repetition(s) or SRS PDSCH release associated with the DCI format is present up to the current PDCCH monitoring occasion and is updated from PDCCH monitoring occasion to PDCCH monitoring occasion. For example, the total DAI value can be any of {1, 2, 3, 4}.

The total DAI value and/or the counter DAI value indicated in the DAI field of DCI can decide the number and order of bits in a dynamic HARQ-ACK codebook. The so-called HARQ-ACK codebook refers to a feedback sequence generated for downlink transmissions scheduled by DCI. However, if PDCCH repetitions are enabled, how to design the values in the DAI field and how to design the HARQ-ACK codebook have not been specified in the current 3GPP specifications.

Embodiments of the present disclosure provide a solution to solve the above problem and/or one or more of other potential problems. According to this solution, PDCCH candidates configured for same PDSCH scheduling may share a same counter DAI value and a same total DAI value. The dynamic HARQ-ACK codebook can be obtained based on the counter and total DAI values comprised in the PDCCH candidates, without introducing additional signaling overhead.

In the following, the terms "transmission occasion", "transmission", "repetition", "reception", "reception occasion", "monitoring occasion", "PDCCH monitoring occasion", "PDCCH transmission occasion", "PDCCH transmission", "PDCCH candidate", "PDCCH reception occasion", "PDCCH reception", "search space", "CORESET" and "PDCCH repetition" can be used interchangeably. The terms "position of the feedback", "HARQ-ACK information location", "HARQ-ACK position", "HARQ-ACK location", "HARQ position", "HARQ location", "feedback position" and "feedback location" can be used interchangeably. In the following, the terms "PDCCH repetitions", "repeated PDCCHs" and "repeated PDCCH signals", "PDCCH candidates configured for same scheduling" can be used interchangeably. The terms "feedback sequence", "feedback codebook", "HARQ-ACK codebook", "codebook", "HARQ-ACK information", "HARQ-ACK message", "HARQ message", "HARQ information", "feedback message" and "feedback information" can be used interchangeably. The terms "HARQ-ACK information field", "HARQ-ACK information location", "feedback field" and "feedback location" can be used interchangeably.

FIG. 1 shows an example communication network 100 in which embodiments of the present disclosure can be implemented. The network 100 includes a network device 110 and a terminal device 120 served by the network device 110. The network 100 may provide one or more serving cells to serve the terminal device 120. Carrier Aggregation (CA) can be supported in the network 100, in which two or more CCs are aggregated in order to support a broader bandwidth. For example, in FIG. 1, the network device 110 may provide to the terminal device 120 a plurality of serving cells including one primary cell (Pcell) 101 corresponding to a primary CC and at least one secondary cell (Scell) 102 corresponding to at least one secondary CC. It is to be understood that the number of network devices, terminal devices and/or serving cells is only for the purpose of illustration without suggesting any limitations to the present disclosure. The network 100 may include any suitable number of network devices, terminal devices and/or serving cells adapted for implementing implementations of the present disclosure.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 120.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device 120 may be connected with a first network device and a second network device (not shown in FIG. 1). One of the first network device and the second network device may be in a master node and the other one may be in a secondary node. The first network device and the second network device may use different radio access technologies (RATs). In one embodiment, the first network device may be a first RAT device and the second network device may be a second RAT device. In one embodiment, the first RAT device may be an eNB and the second RAT device is a gNB. Information related to different RATs may be transmitted to the terminal device 120 from at least one of the first network device and the second network device. In one embodiment, first information may be transmitted to the terminal device 120 from the first network device and second information may be transmitted to the terminal device 120 from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device. The information may be transmitted via any of the following: Radio Resource Control (RRC) signaling, Medium Access Control (MAC) control element (CE) or Downlink Control Information (DCI).

In the communication network 100 as shown in FIG. 1, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

In some embodiments, for downlink transmissions, the network device 110 may transmit control information via PDCCH and/or transmit data via PDSCH to the terminal device 120. Additionally, the network device 110 may transmit one or more reference signals (RSs) to the terminal device 120. The RS transmitted from the network device 110 to the terminal device 120 may also referred to as a "DL RS". Examples of the DL RS may include but are not limited to Demodulation Reference Signal (DMRS), Channel State Information-Reference Signal (CSI-RS), Sounding Reference Signal (SRS), Phase Tracking Reference Signal (PTRS), fine time and frequency Tracking Reference Signal (TRS) and so on.

In some embodiments, for uplink transmissions, the terminal device 120 may transmit control information via a PUCCH and/or transmit data via a PUSCH to the network device 110. Additionally, the terminal device 120 may transmit one or more RSs to the network device 110. The RS transmitted from the terminal device 120 to the network device 110 may also referred to as a "UL RS". Examples of the UL RS may include but are not limited to DMRS, CSI-RS, SRS, PTRS, fine time and frequency TRS and so on.

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

The network device 110 (such as, a gNB) may be equipped with one or more TRPs or antenna panels. As used herein, the term "TRP" refers to an antenna array (with one or more antenna elements) available to the network device located at a specific geographical location. For example, a network device may be coupled with multiple TRPs in different geographical locations to achieve better coverage. The one or more TRPs may be included in a same serving cell or different serving cells.

It is to be understood that the TRP can also be a panel, and the panel can also refer to an antenna array (with one or more antenna elements). Although some embodiments of the present disclosure are described with reference to multiple TRPs for example, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

As shown in FIG. 1, for example, the network device 110 may communicate with the terminal device 120 via TRPs 130-1 and 130-2. In the following text, the TRP 130-1 may be also referred to as the first TRP, while the TRP 130-2 may be also referred to as the second TRP. The first and second TRPs 130-1 and 130-2 may be included in same serving cells (such as, the serving cells 101 and 102 as shown in FIG. 1) or different serving cells provided by the network device 110. Although some embodiments of the present disclosure are described with reference to the first and second TRPs 130-1 and 130-2 within same serving cells provided by the network device 110, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

Figure 2:
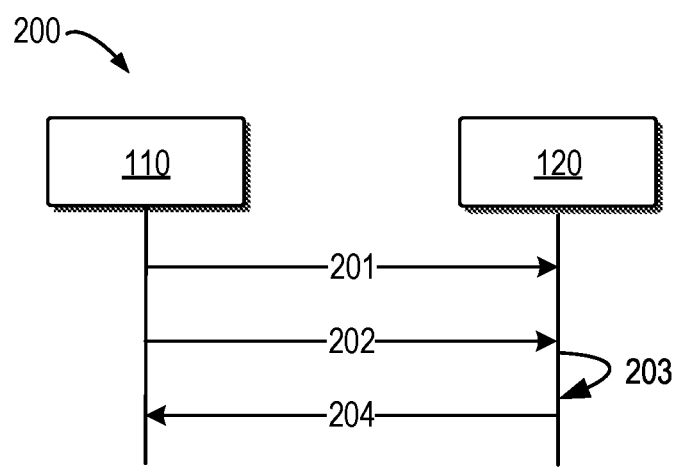
FIG. 2 illustrates a signaling chart of an example process of communication in accordance with some embodiments of the present disclosure.

FIG. 2 illustrates a signaling chart of an example process 200 of communication in accordance with some embodiments of the present disclosure. The process 200 involves the network device 110 and the terminal device 120 as shown in FIG. 1.

As shown in FIG. 2, the network device 110 may transmit (201) DCI over a plurality of PDCCH candidates for scheduling same PDSCH (such as, same data or same transport block) to the terminal device 120. The DCI transmitted over the plurality of PDCCH candidates may indicate a same counter DAI value and/or a same total DAI value. The terminal device 120 may detect (201) the DCI over the plurality of PDCCH candidates from the network device 110. For example, the DCI may not be detected by the terminal device 120 or may be detected over one or more of the PDCCH candidates. The network device 110 may transmit (202) the PDSCH to the terminal device 120. In response to the DCI being detected over one or more of the PDCCH candidates, the terminal device 120 may decode (202) the PDSCH transmitted from the network device 110. The terminal device 120 may generate (203) a HARQ-ACK codebook for the PDSCH at least based on a first configuration of at least one PDCCH candidate comprised in the plurality of PDCCH candidates and the counter and/or total DAI values and transmit (204) the HARQ-ACK codebook to the network device 110.

In some embodiments, the network device 110 may transmit, to the terminal device 120, a configuration indicative of N PDCCH candidates associated/linked with each other, for example, 2≤N≤8. That is, the N PDCCH candidates are configured for scheduling at least one of same PDSCH, same data, same transport block(s), same PUSCH, same uplink data, same downlink data, same uplink transport block(s), same downlink transport block(s), same aperiodic CSI-RS transmission/reception, same aperiodic SRS transmission/reception, same PUCCH, same CSI feedback. In some embodiments, the network device 110 may transmit, to the terminal device 120, a configuration indicative of a first set of PDCCH candidates associated/linked with a second set of PDCCH candidates. For example, the first set of PDCCH candidates are configured for scheduling at least one of same PDSCH, same data, same transport block(s), same PUSCH, same uplink data, same downlink data, same uplink transport block(s), same downlink transport block(s), same aperiodic CSI-RS transmission/reception, same aperiodic SRS transmission/reception, same PUCCH, same CSI feedback with the second set of PDCCH candidates. For example, the configuration may be transmitted via any of Radio Resource Control (RRC) signaling, Medium Access Control (MAC) control element (CE) and DCI.

In some embodiments, the N PDCCH candidates may be comprised in one search space. In some embodiments, the search space may be associated with one control resource set (CORESET), which may be configured with two transmission configuration indication (TCI) states X and Y. For example, N1 PDCCH candidates (where N1 is an integer and 1≤N1≤N) may be configured with TCI state X and (N−N1) PDCCH candidates may be configured with TCI state Y. Alternatively, in some embodiments, the search space may be associated with two CORESETs. For example, N1 PDCCH candidates (where N1 is an integer and 1≤N1≤N) may be associated with a first CORESET and (N−N1) PDCCH candidates may be associated with a second CORESET. In some embodiments, the N1 PDCCH candidates may be represented as the second set of PDCCH candidates. In some embodiments, the N–N1 PDCCH candidates may be represented as the first set of PDCCH candidates.

In some embodiments, the N PDCCH candidates may be comprises in two search spaces associated with each other. For example, N1 PDCCH candidates (where N1 is an integer and $1 \le N1 \le N$) may be associated with a first search space and (N–N1) PDCCH candidates may be associated with a second search space. In some embodiments, the two search spaces may be associated with one CORESET. Alternatively, in some embodiments, the two search spaces may be associated with two CORESETs respectively.

In some embodiments, the N1 PDCCH candidates may be represented as the second set of PDCCH candidates. In some embodiments, the N–N1 PDCCH candidates may be represented as the first set of PDCCH candidates.

In some embodiments, the N PDCCH candidates configured for same PDSCH scheduling may comprise L PDCCH candidates acting as reference PDCCH candidates and N–L PDCCH candidates acting as non-reference PDCCH candidates, where L is an integer and $1 \le L \le N$, for example, L=1. In some embodiments, the HARQ-ACK codebook for the PDSCH or SPS PDSCH release scheduled by DCI in the N PDCCH candidates may include HARQ-ACK information fields corresponding to the L reference PDCCH candidates. That is, the HARQ-ACK information field for the PDSCH or SPS PDSCH release scheduled by DCI in any of the N–L non-reference PDCCH candidates may be the same as the HARQ-ACK information field generated for the PDSCH or SPS PDSCH release scheduled by DCI in a corresponding one of the L reference PDCCH candidates. In other words, for the PDSCH or SPS PDSCH release scheduled by any of the N–L PDCCH candidates in a search space and/or CORESET, the HARQ-ACK information field may be generated based on timing information (e.g., start and/or end symbols of the PDCCH monitoring occasion) of a corresponding one of the L reference PDCCH candidates in an associated/linked search space and/or CORESET as well as the counter and/or total DAI values. In some embodiments, the N PDCCH candidates configured for same PDSCH scheduling may share a same counter DAI value and a same total DAI value. In some embodiments, the L reference PDCCH candidates may include the first PDCCH candidate, or a PDCCH candidate (e.g., the first one) in the first linked search space and/or CORESET. Alternatively, the L reference PDCCH candidates may include the last PDCCH candidate, or a PDCCH candidate (e.g., the last one) in the last linked search space and/or CORESET. Alternatively, the L reference PDCCH candidates may include a configured PDCCH candidate, or a PDCCH candidate configured on a search space and/or CORESET (e.g., via any of RRC signaling, MAC CE and DCI). In some embodiments, the HARQ-ACK codebook for the PDSCH or SPS PDSCH release scheduled by DCI in the N–L or in the first set of PDCCH candidates may be generated based on the configuration of the L or the first set of PDCCH candidates and at least one of the counter DAI value and the total DAI value.

In some embodiments, the L PDCCH candidates may be represented as the second set of PDCCH candidates. In some embodiments, the N–L PDCCH candidates may be represented as the first set of PDCCH candidates.

In some embodiments, the configuration of a PDCCH candidate may include at least one of: search space information for the PDCCH candidate, CORESET information for the PDCCH candidate, a time domain resource for the PDCCH candidate, a timing for the PDCCH candidate, a PDCCH monitoring occasion for the PDCCH candidate, a time domain resource for the PDCCH monitoring occasion, a timing for the PDCCH monitoring occasion, a slot for the PDCCH candidate, a slot for the PDCCH monitoring occasion, a starting and/or ending symbol for the PDCCH candidate, a number of symbols for the PDCCH candidate. In some embodiments, the configuration may be transmitted via any of RRC signaling, MAC CE and DCI.

In some embodiments, the N PDCCH candidates configured for same PDSCH scheduling may comprise L PDCCH candidates acting as reference PDCCH candidates and N–L PDCCH candidates acting as non-reference PDCCH candidates, where L is an integer and $1 \le L \le N$, for example, L=1. In some embodiments, the L reference PDCCH candidates may contribute to determination of counter DAI values and total DAI values for PDCCH candidates, while the N–L non-reference PDCCH candidates may contribute nothing to the determination of counter DAI values and total DAI values for PDCCH candidates.

In some embodiments, if N PDCCH candidates are configured for same PDSCH scheduling based on the configuration about search space(s), CORESET(s) and/or the association/linkage among the N PDCCH candidates, the HARQ-ACK codebook may be generated based on the configuration of the L reference PDCCH candidates and the counter and/or total DAI values in DCI over any one of the N PDCCH candidates. In some embodiments, if PDCCH candidates A and B are configured to be associated (for example, configured for same PDSCH scheduling). In some embodiments, the HARQ-ACK codebook for the PDSCH or SPS PDSCH release scheduled in DCI over the PDCCH candidates B may be generated based on the counter and/or total DAI values as well as the configuration of the PDCCH candidate A. For example, the PDCCH candidates A and B may share a same counter DAI value and a same total DAI value. For example, only the PDCCH candidate A may contribute to the counting of counter DAI values and total DAI values for PDCCH candidates, while the PDCCH candidate B may not contribute to the counting of counter DAI values and total DAI values for PDCCH candidates. In some embodiments, the HARQ-ACK codebook for the PDSCH or SPS PDSCH release scheduled at least one of the PDCCH candidates A and B may be generated based on the counter and/or total DAI values as well as the configuration of the PDCCH candidate A. For example, the configuration of the PDCCH candidate A may indicate at least one of a search space, a CORESET, a serving cell index, a search space information, a CORESET information, a time domain resource, a timing, a PDCCH monitoring occasion, a time domain resource for the PDCCH monitoring occasion, a timing for the PDCCH monitoring occasion, a slot, a slot for the PDCCH monitoring occasion, a starting and/or ending symbol, a number of symbols and CORESETPoolIndex configured for the PDCCH candidate A. For example, the HARQ-ACK codebook for the PDSCH or SPS PDSCH release scheduled at least one of the PDCCH candidates A and B may be generated without considering the counter and/or total DAI values in the PDCCH candidate B.

Figure 3A:
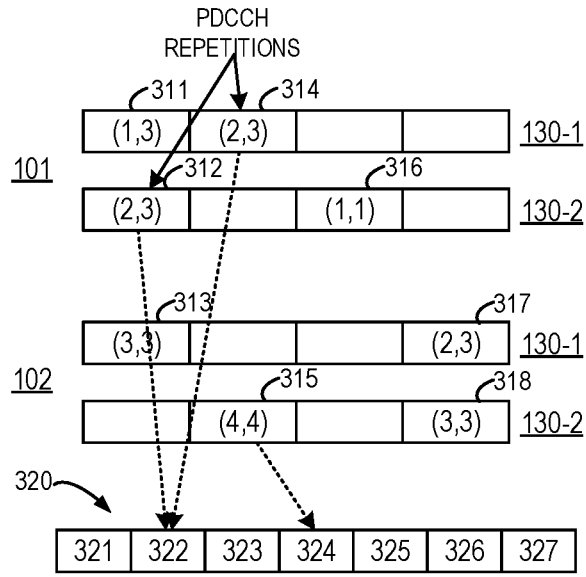
FIGS. 3A-3B illustrate examples of embodiments of the present disclosure.

FIG. 3A illustrates an example of such embodiments. FIG. 3A shows PDCCH candidates 311, 312 . . . 318. Each of the PDCCH candidates 311, 312 . . . 318 comprises a pair of counter DAI value c and total DAI value t, represented as (c, t), where c and t are both integers, for example, $1 \le c \le 4$ and $1 \le t \le 4$. As shown in FIG. 3A, the PDCCH candidates 311 and 314 are associated with the TRP 130-1 and the serving cell 101. The PDCCH candidates 312 and 316 are associated with the TRP 130-2 and the serving cell 101. The PDCCH candidates 313 and 317 are associated with the TRP 130-1 and the serving cell 102. The PDCCH candidates 315 and 318 are associated with the TRP 130-2 and the serving cell 102. The PDCCH candidates 312 and 314 are configured for same PDSCH scheduling, that is, linked as PDCCH repetitions. FIG. 3A shows a HARQ-ACK codebook 320 for PDSCHs scheduled by the PDCCH candidates 311, 312 . . . 318. The HARQ-ACK codebook 320 comprises HARQ-ACK information fields 321, 322 . . . 327. For example, each feedback filed includes one bit or two bits. The PDCCH repetitions 312 and 314 correspond to a same HARQ-ACK information field 322, which may be generated based on a configuration of the PDCCH candidate 312 and the counter and/or total DAI values comprised in the PDCCH candidate 312.

In some embodiments, if PDCCH candidates A and B are configured for same PDSCH scheduling, the HARQ-ACK codebook for the PDSCH or SPS PDSCH release scheduled at least one of the PDCCH candidates A and B may be generated based on the counter and/or total DAI values as well as the configuration of the PDCCH candidate A. For example, if the PDCCH candidate A is missed or unsuccessfully decoded but the PDCCH candidate B is successfully decoded by the terminal device 120, the terminal device 120 may determine the HARQ-ACK information field in the HARQ-ACK codebook based on the configuration of the PDCCH candidate A and the counter and/or total DAI values comprised in the PDCCH candidate A. For example, with reference to FIG. 3A, if the PDCCH candidate 312 is missed or unsuccessfully decoded but the PDCCH candidate 314 is successfully decoded by the terminal device 120, the terminal device 120 may determine the HARQ-ACK information field 322 in the HARQ-ACK codebook 320 based on the configuration of the PDCCH candidate 312 and the counter and/or total DAI values comprised in the PDCCH candidate 312.

Alternatively, in case that PDCCH candidates A and B are not configured for same PDSCH scheduling, if the PDCCH candidate A is missed or unsuccessfully decoded but the PDCCH candidate B is successfully decoded by the terminal device 120, the terminal device 120 may determine the HARQ-ACK information field in the HARQ-ACK codebook based on the configuration of the PDCCH candidate B and the counter and/or total DAI values comprised in the PDCCH candidate B. For example, the terminal device 120 can determine that the PDCCH candidate B is configured for different scheduling from the PDCCH candidate A based on configurations of other PDCCH candidates that are successfully detected, for example, counter and/or total DAI values of the other PDCCH candidates.

Figure 3B:
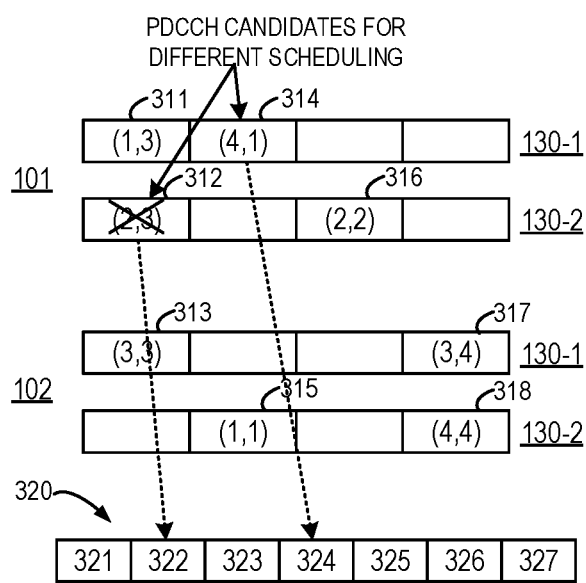

FIG. 3B illustrates an example of such embodiments. FIG. 3B shows PDCCH candidates 311, 312 . . . 318. Each of the PDCCH candidates 311, 312 . . . 318 comprises a pair of counter DAI value c and total DAI value t, represented as (c, t), where c and t are both integers, for example, 1≤c≤4 and 1≤t≤4. As shown in FIG. 3B, the PDCCH candidates 311 and 314 are associated with the TRP 130-1 and the serving cell 101. The PDCCH candidates 312 and 316 are associated with the TRP 130-2 and the serving cell 101. The PDCCH candidates 313 and 317 are associated with the TRP 130-1 and the serving cell 102. The PDCCH candidates 315 and 318 are associated with the TRP 130-2 and the serving cell 102. FIG. 3B also shows a HARQ-ACK codebook 320 for PDSCHs scheduled by the PDCCH candidates 311, 312 . . . 318. The HARQ-ACK codebook 320 comprises HARQ-ACK information fields 321, 322 . . . 327. For example, each feedback filed includes one bit or two bits. If the PDCCH candidate 312 is missed or unsuccessfully decoded but the PDCCH candidate 314 is successfully decoded by the terminal device 120, the terminal device 120 may determine, based on the counter and/or total DAI values of other PDCCH candidates 313 and 315, that the PDCCH candidate 314 is configured for different scheduling from the PDCCH candidate 312. The terminal device 120 can determine the HARQ-ACK information field 324 corresponding to the PDCCH candidate 314 in the HARQ-ACK codebook 320 based on the configuration of the PDCCH candidate 314 and the counter and/or total DAI values comprised in the PDCCH candidate 314.

In some embodiments, the terminal device 120 may determine whether PDCCH candidates A and B are configured for same or different scheduling based on configurations of other PDCCH candidates that are successfully detected, for example, counter and/or total DAI values of the other PDCCH candidates.

Figure 4A:
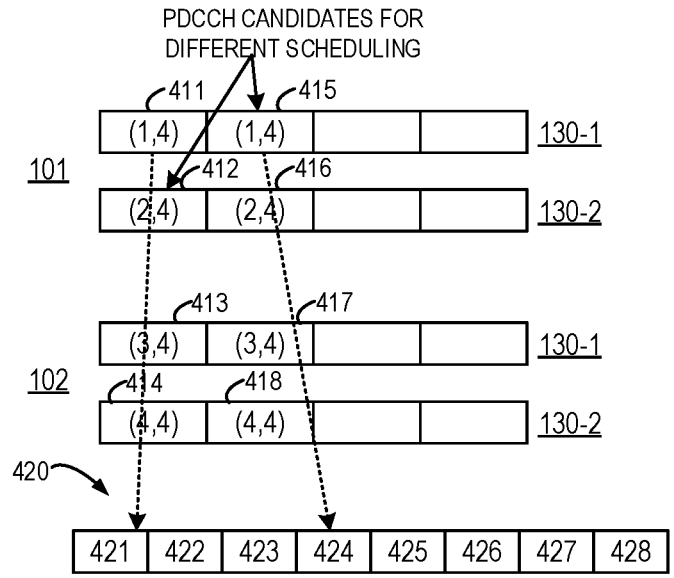
FIGS. 4A-4B illustrate examples of embodiments of the present disclosure.
Figure 4B:
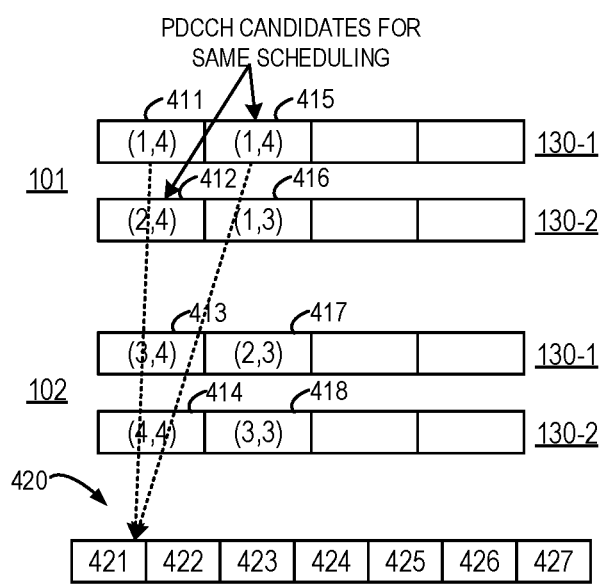

FIGS. 4A and 4B illustrate examples of such embodiments. FIGS. 4A and 4B each shows PDCCH candidates 411, 412 . . . 418. Each of the PDCCH candidates 411, 412 . . . 418 comprises a pair of counter DAI value c and total DAI value t, represented as (c, t), where c and t are both integers, for example, 1≤c≤4 and 1≤t≤4. The PDCCH candidates 411 and 415 are associated with the TRP 130-1 and the serving cell 101. The PDCCH candidates 412 and 416 are associated with the TRP 130-2 and the serving cell 101. The PDCCH candidates 413 and 417 are associated with the TRP 130-1 and the serving cell 102. The PDCCH candidates 414 and 418 are associated with the TRP 130-2 and the serving cell 102. FIGS. 4A and 4B also show a HARQ-ACK codebook 420 for PDSCHs scheduled by the PDCCH candidates 411, 412 . . . 418. As shown in FIG. 4A, the terminal device 120 may determine, based on counter and/or total DAI values of PDCCH candidates 416~418 which are successfully detected, that the PDCCH candidates 411 and 415 are configured for different scheduling and thus correspond to different HARQ-ACK information fields 421 and 424 in the HARQ-ACK codebook 420. As shown in FIG. 4B, the terminal device 120 may determine, based on counter and/or total DAI values of PDCCH candidates 416~418 which are successfully detected, that the PDCCH candidates 411 and 415 are configured for same scheduling and thus correspond to a same HARQ-ACK information field 421 in the HARQ-ACK codebook 420.

In some embodiments, if PDCCH candidates A and B are configured for same PDSCH scheduling, the HARQ-ACK codebook for the PDSCH or SPS PDSCH release scheduled at least one of the PDCCH candidates A and B may be generated based on the counter and/or total DAI values as well as the configuration of the PDCCH candidate A. For example, if the PDCCH candidate A is successfully decoded but the PDCCH candidate B is missed or unsuccessfully decoded by the terminal device 120, the terminal device 120 may determine the HARQ-ACK information field corresponding to the PDCCH candidate A in the HARQ-ACK codebook based on the configuration of the PDCCH candidate A which is successfully detected and the counter and/or total DAI values comprised in the PDCCH candidate A. For example, with reference to FIG. 3A, if the PDCCH candidate 312 is successfully decoded but the PDCCH candidate 314 is missed or unsuccessfully decoded by the terminal device 120, the terminal device 120 may determine the HARQ-ACK information field 322 corresponding to the PDCCH candidate 312 in the HARQ-ACK codebook 320 based on the configuration of the PDCCH candidate 312 which is successfully detected and the counter and/or total DAI values comprised in the PDCCH candidate 312. For another example, if the PDCCH candidate 315 is missed or unsuccessfully decoded by the terminal device 120, the terminal device 120 may determine the HARQ-ACK information field 324 corresponding to the PDCCH candidate 315 in the HARQ-ACK codebook 320 based on the configuration of the PDCCH candidate 315 which is successfully detected and the counter and/or total DAI values comprised in the PDCCH candidate 315.

In some embodiments, in case that PDCCH candidates A and B are not configured for same PDSCH scheduling or there is no DCI transmitted over the later PDCCH candidate B, if the PDCCH candidate A is successfully decoded but the PDCCH candidate B is missed or unsuccessfully decoded by the terminal device 120, the terminal device 120 may determine the HARQ-ACK codebook (for example, the HARQ-ACK information field corresponding to the PDCCH candidate A in the HARQ-ACK codebook) based on the configuration of the PDCCH candidate A which is successfully detected and the counter and/or total DAI values comprised in the PDCCH candidate A. For example, the terminal device may assume that the PDCCH candidate B is configured for different scheduling even if no DCI is transmitted over the PDCCH candidate B. For another example, if the PDCCH candidate B is configured for different scheduling from the PDCCH candidate A but is unsuccessfully decoded by the terminal device 120, the terminal device 120 may generate the HARQ-ACK codebook based on configurations of other PDCCH candidates that are successfully decoded, for example, based on counter and/or total DAI values of the other PDCCH candidates.

Figure 5:
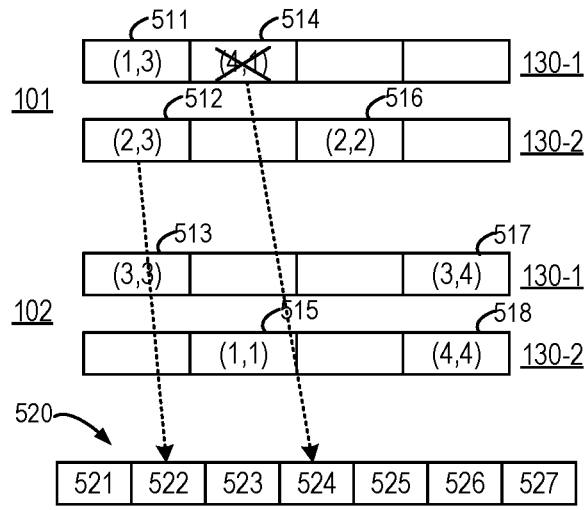
FIG. 5 illustrates an example of embodiments of the present disclosure.

FIG. 5 illustrates an example of such embodiments. FIG. 5 shows PDCCH candidates 511, 512 . . . 518. Each of the PDCCH candidates 511, 512 . . . 518 comprises a pair of counter DAI value c and total DAI value t, represented as (c, t), where c and t are both integers, for example, $1 \leq c \leq 4$ and $1 \leq t \leq 4$. As shown in FIG. 5, it is assumed that the PDCCH candidates 512 and 514 are not configured for same PDSCH scheduling or there is no DCI transmitted over the PDCCH candidate 514. If the PDCCH candidate 512 is successfully decoded but the PDCCH candidate 514 is missed or unsuccessfully decoded by the terminal device 120, the terminal device 120 may determine a HARQ-ACK information field 522 corresponding to the PDCCH candidate 512 in a HARQ-ACK codebook 520 based on the configuration of the PDCCH candidate 512 which is successfully detected and the counter and/or total DAI values comprised in the PDCCH candidate 512. If other PDCCH candidates 511~513 and 515~518 are successfully decoded by the terminal device 120, the terminal device 120 may generate the HARQ-ACK codebook 520 comprising a HARQ-ACK information field 524 corresponding to the PDCCH candidate 514 based on configurations of the other PDCCH candidates 511~513 and 515~518, for example, based on counter and/or total DAI values of the other PDCCH candidates 511~513 and 515~518.

In some embodiments, in case that PDCCH candidates A and B are configured for same PDSCH scheduling, if both of the PDCCH candidates A and B are missed or unsuccessfully decoded, the terminal device 120 may determine the HARQ-ACK codebook based on counter and/or total DAI values of the detected PDCCH candidates.

Figure 6:
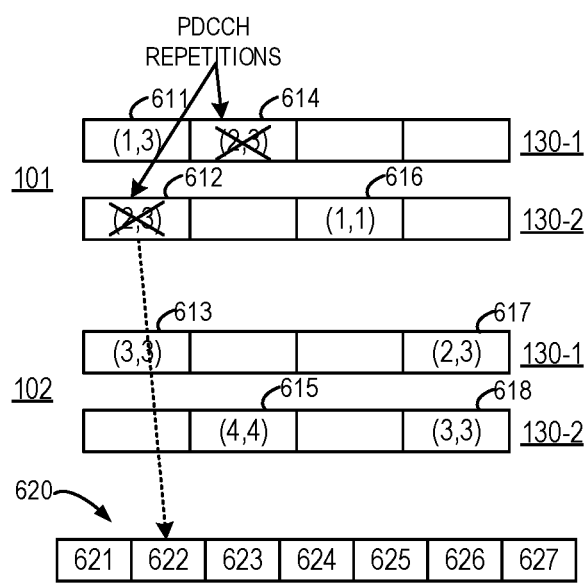
FIG. 6 illustrates an example of embodiments of the present disclosure.

FIG. 6 illustrates an example of such embodiments. FIG. 6 shows PDCCH candidates 611, 612 . . . 618. Each of the PDCCH candidates 611, 612 . . . 618 comprises a pair of counter DAI value c and total DAI value t, represented as (c, t), where c and t are both integers, for example, $1 \leq c \leq 4$ and $1 \leq t \leq 4$. As shown in FIG. 6, it is assumed that the PDCCH candidates 612 and 614 are configured for same PDSCH scheduling. If both of the PDCCH candidates 612 and 614 are missed or unsuccessfully decoded but other PDCCH candidates 611, 613 and 615~618 are successfully decoded by the terminal device 120, the terminal device 120 may generate a HARQ-ACK codebook 620 comprising a HARQ-ACK information field 622 corresponding to the PDCCH candidate 612 based on configurations of the other PDCCH candidates 611, 613 and 615~618, for example, based on counter and/or total DAI values of the other PDCCH candidates 611, 613 and 615~618. For example, in this case, the value of the HARQ-ACK information field 622 may be NACK.

In some embodiments, in case that PDCCH candidates A and B are configured for different scheduling, if both of the PDCCH candidates A and B are missed or unsuccessfully decoded, the terminal device 120 may determine the HARQ-ACK codebook based on counter and/or total DAI values of the detected PDCCH candidates.

Figure 7:
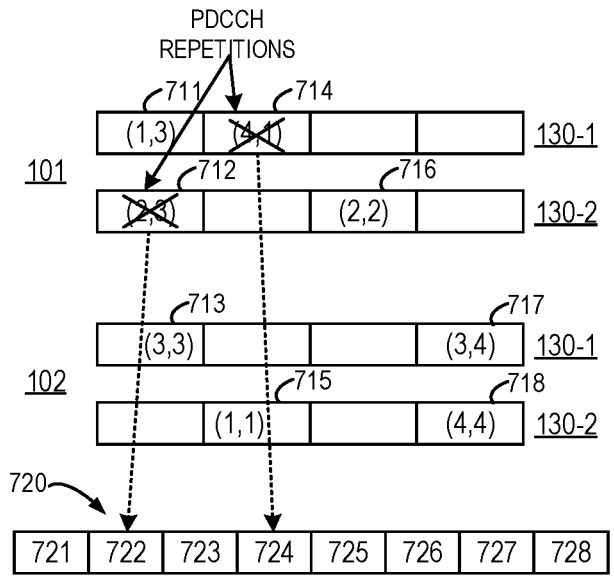
FIG. 7 illustrates an example of embodiments of the present disclosure.

FIG. 7 illustrates an example of such embodiments. FIG. 7 shows PDCCH candidates 711, 712 . . . 718. Each of the PDCCH candidates 711, 712 . . . 718 comprises a pair of counter DAI value c and total DAI value t, represented as (c, t), where c and t are both integers, for example, $1 \leq c \leq 4$ and $1 \leq t \leq 4$. As shown in FIG. 7, it is assumed that the PDCCH candidates 712 and 714 are configured for different scheduling. If both of the PDCCH candidates 712 and 714 are missed or unsuccessfully decoded but other PDCCH candidates 711, 713 and 715~718 are successfully decoded by the terminal device 120, the terminal device 120 may generate a HARQ-ACK codebook 720 comprising a HARQ-ACK information field 722 corresponding to the PDCCH candidate 712 and a HARQ-ACK information field 724 corresponding to the PDCCH candidate 714 based on configurations of the other PDCCH candidates 711, 713 and 715~718, for example, based on counter and/or total DAI values of the other PDCCH candidates 611, 613 and 615~618. For example, in this case, the value of the HARQ-ACK information field 722 may be NACK and the value of the HARQ-ACK information field 724 may be NACK too.

In some embodiments, in case that PDCCH candidate B is the last PDCCH candidate (for example, if the terminal device 120 does not detect any other DCI format in the same PDCCH monitoring occasion as the PDCCH candidate B and does not detect any DCI format in the following PDCCH monitoring occasion), if PDCCH candidate A and PDCCH candidate B are missed or unsuccessfully detected, or if the PDCCH candidate A is successfully detected but the PDCCH candidate B is missed or unsuccessfully detected, the terminal device 120 may assume that the PDCCH candidate B is configured for same PDSCH scheduling as the PDCCH candidate A and generate a HARQ-ACK codebook based on counter and/or total DAI values in the detected PDCCH candidates.

Figure 8A:
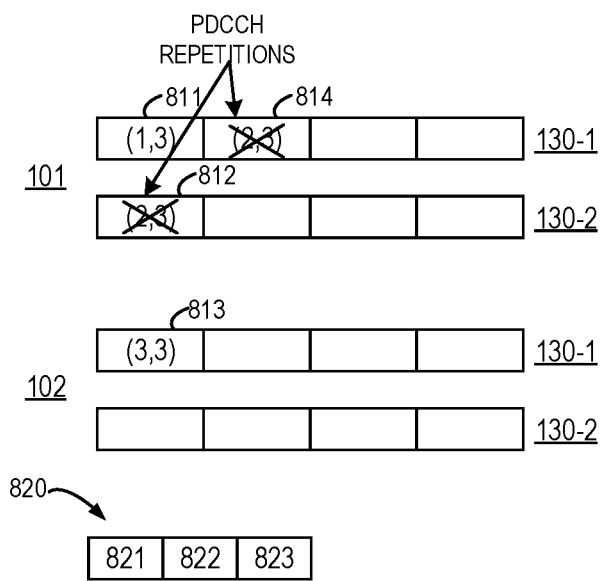
FIGS. 8A-8B illustrate examples of embodiments of the present disclosure.
Figure 8B:
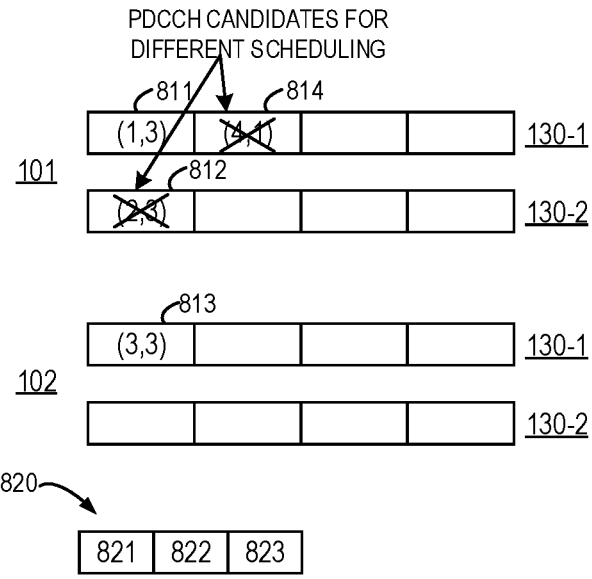

FIGS. 8A and 8B illustrate examples of such embodiments. FIGS. 8A and 8B show PDCCH candidates 811, 812 . . . 814. Each of the PDCCH candidates 811, 812 . . . 814 comprises a pair of counter DAI value c and total DAI value t, represented as (c, t), where c and t are both integers, for example, $1 \leq c \leq 4$ and $1 \leq t \leq 4$.

In FIG. 8A, it is assumed that the PDCCH candidates 812 and 814 are configured for same PDSCH scheduling. If the terminal device 120 does not detect any other DCI format in the same PDCCH monitoring occasion as the PDCCH candidate 814 and does not detect any DCI format in the following PDCCH monitoring occasion, the terminal device 120 may determine the PDCCH candidate 814 as the last PDCCH candidate and may assume that the PDCCH candidate 814 is configured for same PDSCH scheduling as the PDCCH candidate 812. If both of the PDCCH candidates 812 and 814 are missed or unsuccessfully decoded but other PDCCH candidates 811 and 813 are successfully decoded by the terminal device 120, the terminal device 120 may generate a HARQ-ACK codebook 820 comprising a HARQ-ACK information field 822 corresponding to the PDCCH candidates 812 and 814 based on configurations of the other PDCCH candidates 811 and 813, for example, based on counter and/or total DAI values of the PDCCH candidates 811 and 813. For example, in this case, the value of the HARQ-ACK information field 822 may be NACK.

In FIG. 8B, it is assumed that the PDCCH candidates 812 and 814 are configured for different scheduling. If the terminal device 120 does not detect any other DCI format in the same PDCCH monitoring occasion as the PDCCH candidate 814 and does not detect any DCI format in the following PDCCH monitoring occasion, the terminal device 120 may determine the PDCCH candidate 814 as the last PDCCH candidate and may assume that the PDCCH candidate 814 is configured for same PDSCH scheduling as the PDCCH candidate 812. If both of the PDCCH candidates 812 and 814 are missed or unsuccessfully decoded but other PDCCH candidates 811 and 813 are successfully decoded by the terminal device 120, the terminal device 120 may generate a HARQ-ACK codebook 820 comprising a HARQ-ACK information field 822 corresponding to the PDCCH candidates 812 and 814 based on configurations of the other PDCCH candidates 811 and 813, for example, based on counter and/or total DAI values of the PDCCH candidates 811 and 813. For example, in this case, the value of the HARQ-ACK information field 822 may be NACK.

In some embodiments, if PDCCH candidate B is successfully detected but PDCCH candidate A is missed or unsuccessfully detected (or if the PDCCH candidate A is successfully detected), and if the value of the total DAI value in the PDCCH candidate B is same as any of PDCCH candidates detected in the same PDCCH monitoring occasion as the PDCCH candidate A, the terminal device 120 may determine the HARQ-ACK information field for the PDCCH candidate B based on the configuration of the PDCCH candidate A and the counter and/or total DAI values comprised in the PDCCH candidate B.

Figure 9:
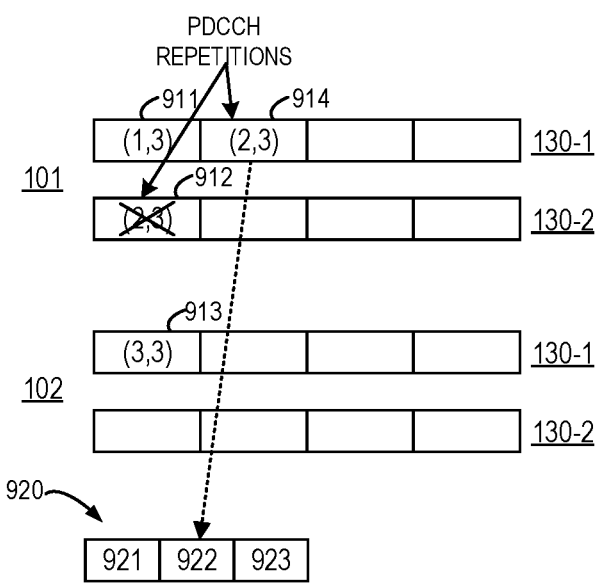
FIG. 9 illustrates an example of embodiments of the present disclosure.

FIG. 9 illustrates an example of such embodiments. FIG. 9 shows PDCCH candidates 911, 912 . . . 918. Each of the PDCCH candidates 911, 912 . . . 918 comprises a pair of counter DAI value c and total DAI value t, represented as (c, t), where c and t are both integers, for example, $1 \le c \le 4$ and $1 \le t \le 4$. As shown in FIG. 9, in case that the PDCCH candidate 914 is successfully detected but the PDCCH candidate 912 is missed or unsuccessfully detected, if the total DAI value in the PDCCH candidate 914 is same as any of the PDCCH candidates 911 and 913 detected in the same PDCCH monitoring occasion as the PDCCH candidate 912, the terminal device 120 may determine a HARQ-ACK information field 922 corresponding to the PDCCH candidate 914 in a HARQ-ACK codebook 920 based on the configuration of the PDCCH candidate 912 and the counter and/or total DAI values comprised in the PDCCH candidate 914.

In some embodiments, if PDCCH candidate B is successfully detected but PDCCH candidate A is missed or unsuccessfully detected (or if the PDCCH candidate A is successfully detected), and if the value of the total DAI value in the PDCCH candidate B is different from all of PDCCH candidates detected in the same PDCCH monitoring occasion as the PDCCH candidate A, the terminal device 120 may determine the HARQ-ACK information field for the PDCCH candidate B based on the configuration of the PDCCH candidate B and the counter and/or total DAI values comprised in the PDCCH candidate B.

Figure 10A:
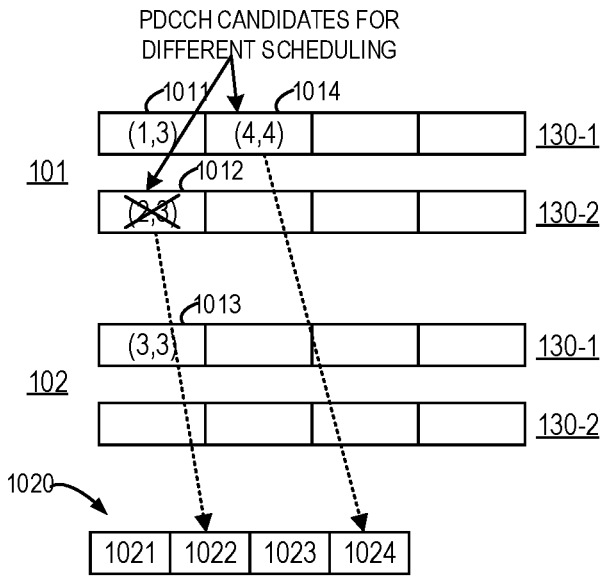
FIGS. 10A-10B illustrate examples of embodiments of the present disclosure.
Figure 10B:
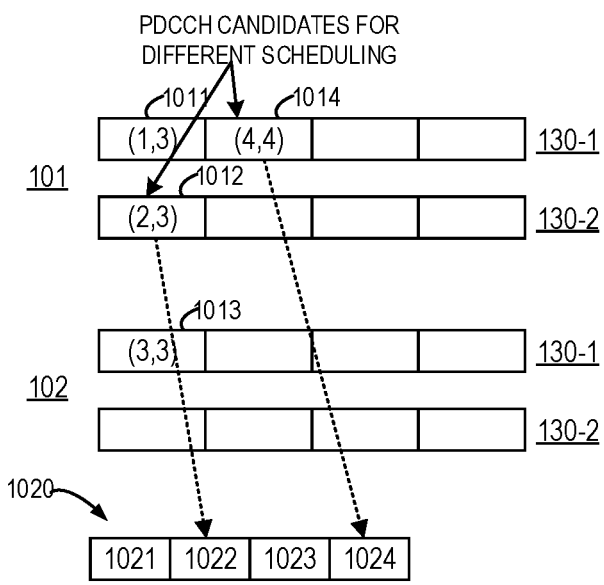

FIGS. 10A and 10B illustrate examples of such embodiments. FIGS. 10A and 10B show PDCCH candidates 1011, 1012 . . . 1014. Each of the PDCCH candidates 1011, 1012 . . . 1014 comprises a pair of counter DAI value c and total DAI value t, represented as (c, t), where c and t are both integers, for example, $1 \le c \le 4$ and $1 \le t \le 4$.

As shown in FIG. 10A, if the PDCCH candidate 1014 is successfully detected but the PDCCH candidate 1012 is missed or unsuccessfully detected by the terminal device 120, since the total DAI value in the PDCCH candidate 1014 is different from all of the PDCCH candidates 1011 and 1013 detected in the same PDCCH monitoring occasion as the PDCCH candidate 1012, the terminal device 120 may determine a HARQ-ACK information field 1024 corresponding to the PDCCH candidate 1014 in a HARQ-ACK codebook 1020 based on the configuration of the PDCCH candidate 1014 and the counter and/or total DAI values comprised in the PDCCH candidate 1014.

As shown in FIG. 10B, if both the PDCCH candidates 1012 and 1014 are successfully detected by the terminal device 120, since the total DAI value in the PDCCH candidate 1014 is different from all of the PDCCH candidates 1011~1013, the terminal device 120 may determine a HARQ-ACK information field 1022 corresponding to the PDCCH candidate 1012 and a HARQ-ACK information field 1024 corresponding to the PDCCH candidate 1014 in a HARQ-ACK codebook 1020 based on configurations of the PDCCH candidates 1012 and 1014 and counter and/or total DAI values comprised in the PDCCH candidates 1012 and 1014.

In some embodiments, in case that PDCCH candidate B is the last PDCCH candidate (for example, if the terminal device 120 does not detect any other DCI format in the same PDCCH monitoring occasion as the PDCCH candidate B and does not detect any DCI format in the following PDCCH monitoring occasion), if PDCCH candidate A and PDCCH candidate B are missed or unsuccessfully detected, or if the PDCCH candidate A is successfully detected but the PDCCH candidate B is missed or unsuccessfully detected, the terminal device 120 may assume that the PDCCH candidate B is configured for different scheduling from the PDCCH candidate A. In this event, the terminal device 120 may reserve a HARQ-ACK information field for the PDCCH candidate B in the HARQ-ACK codebook no matter whether DCI is detected or not in the PDCCH candidate B.

Figure 11A:
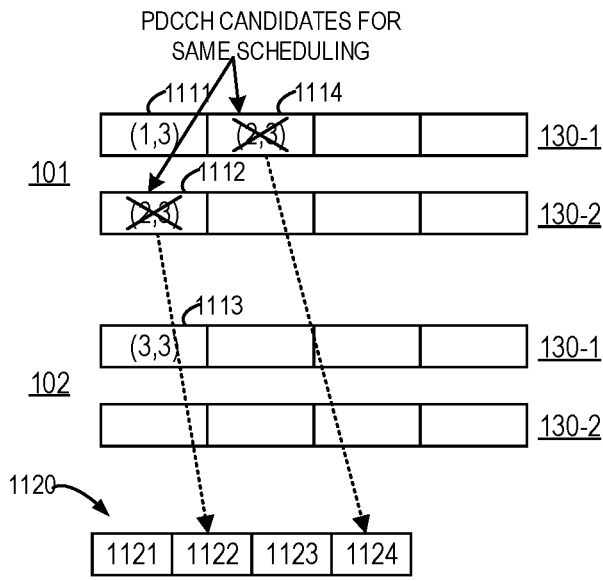
FIGS. 11A-11B illustrate examples of embodiments of the present disclosure.
Figure 11B:
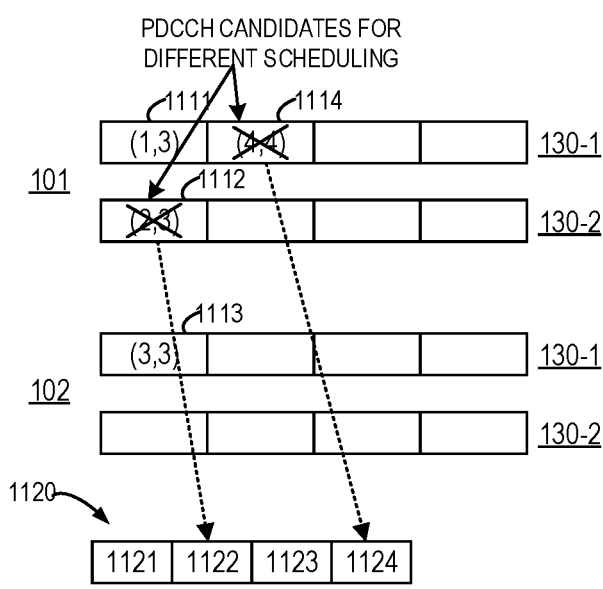

FIGS. 11A and 11B illustrate examples of such embodiments. FIGS. 11A and 11B show PDCCH candidates 1111, 1112 . . . 1114. Each of the PDCCH candidates 1111, 1112 . . . 1114 comprises a pair of counter DAI value c and total DAI value t, represented as (c, t), where c and t are both integers, for example, $1 \le c \le 4$ and $1 \le t \le 4$.

In FIG. 11A, it is assumed that the PDCCH candidates 1112 and 1114 are configured for same PDSCH scheduling. If the terminal device 120 does not detect any other DCI format in the same PDCCH monitoring occasion as the PDCCH candidate 1114 and does not detect any DCI format in the following PDCCH monitoring occasion, the terminal device 120 may determine the PDCCH candidate 1114 as the last PDCCH candidate and may assume that the PDCCH candidate 1114 is configured for different scheduling from the PDCCH candidate 1112. If both of the PDCCH candidates 1112 and 1114 are missed or unsuccessfully decoded but other PDCCH candidates 1111 and 1113 are successfully decoded by the terminal device 120, the terminal device 120 may generate a HARQ-ACK codebook 1120 comprising a HARQ-ACK information field 1122 corresponding to the PDCCH candidate 1112 based on configurations of the other PDCCH candidates 1111 and 1113, for example, based on counter and/or total DAI values of the PDCCH candidates 1111 and 1113. Moreover, the terminal device 120 may reserve an additional HARQ-ACK information field 1124 at the end of the HARQ-ACK codebook 1120 for the PDCCH candidate 1114. For example, in this case, the value of the HARQ-ACK information field 1122 and the value of the HARQ-ACK information field 1124 may be NACK.

In FIG. 11B, it is assumed that the PDCCH candidates 1112 and 1114 are configured for different scheduling. If the terminal device 120 does not detect any other DCI format in the same PDCCH monitoring occasion as the PDCCH candidate 1114 and does not detect any DCI format in the following PDCCH monitoring occasion, the terminal device 120 may determine the PDCCH candidate 1114 as the last PDCCH candidate and may assume that the PDCCH candidate 1114 is configured for different scheduling from the PDCCH candidate 1112. If both of the PDCCH candidates 1112 and 1114 are missed or unsuccessfully decoded but other PDCCH candidates 1111 and 1113 are successfully decoded by the terminal device 120, the terminal device 120 may generate a HARQ-ACK codebook 1120 comprising a HARQ-ACK information field 1122 corresponding to the PDCCH candidate 1112 based on configurations of the other PDCCH candidates 1111 and 1113, for example, based on counter and/or total DAI values of the PDCCH candidates 1111 and 1113. Moreover, the terminal device 120 may reserve an additional HARQ-ACK information field 1124 at the end of the HARQ-ACK codebook 1120 for the PDCCH candidate 1114. For example, in this case, the value of the HARQ-ACK information field 1122 and the value of the HARQ-ACK information field 1124 may be NACK.

In some embodiments, if PDCCH candidate B is successfully detected but PDCCH candidate A is missed or unsuccessfully detected (or if the PDCCH candidate A is successfully detected), and if the value of the total DAI value in the PDCCH candidate B is same as any of PDCCH candidates detected in the same PDCCH monitoring occasion as the PDCCH candidate A, the terminal device 120 may determine the HARQ-ACK information field for the PDCCH candidate B based on the configuration of the PDCCH candidate A and the counter and/or total DAI values comprised in the PDCCH candidate B. Alternatively, the terminal device 120 may reserve a HARQ-ACK information field for the PDCCH candidate B in the HARQ-ACK codebook.

Figure 12A:
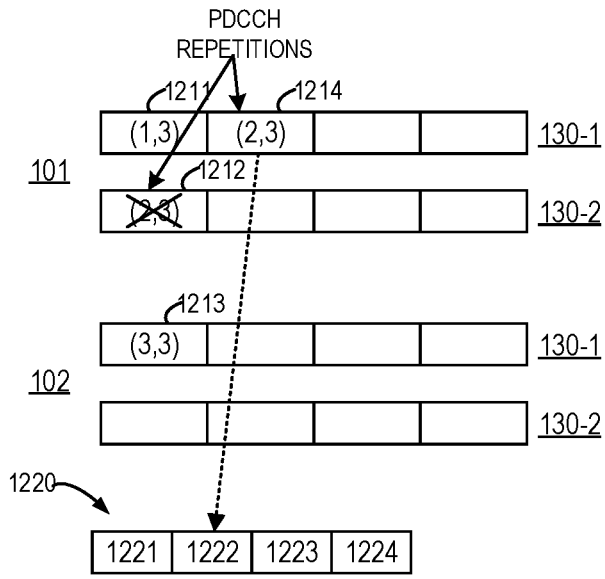
FIGS. 12A-12C illustrate examples of embodiments of the present disclosure.
Figure 12B:
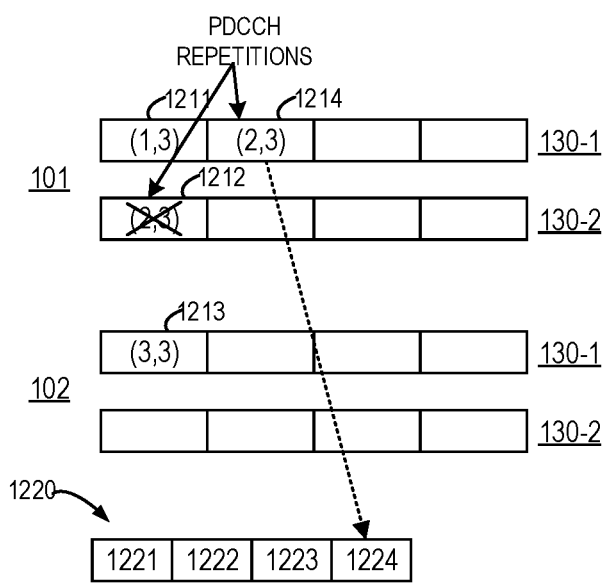
Figure 12C:
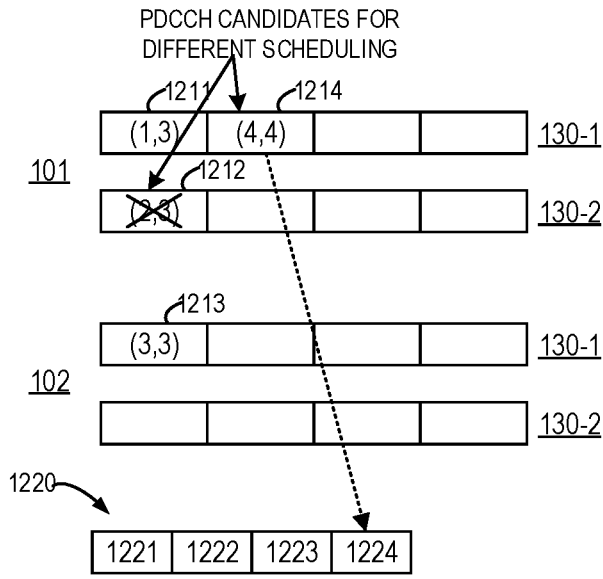

FIGS. 12A, 12B and 12C illustrate examples of such embodiments. FIGS. 12A, 12B and 12C show PDCCH candidates 1211, 1212 . . . 1214. Each of the PDCCH candidates 1211, 1212 . . . 1214 comprises a pair of counter DAI value c and total DAI value t, represented as (c, t), where c and t are both integers, for example, $1 \le c \le 4$ and $1 \le t \le 4$.

In FIG. 12A, it is assumed that the PDCCH candidates 1212 and 1214 are configured for same PDSCH scheduling. In case that the PDCCH candidate 1214 is successfully detected but the PDCCH candidate 1212 is missed or unsuccessfully detected, if the total DAI value in the PDCCH candidate 1214 is same as any of the PDCCH candidates 1211 and 1213 detected in the same PDCCH monitoring occasion as the PDCCH candidate 1212, the terminal device 120 may determine a HARQ-ACK information field 1222 corresponding to the PDCCH candidate 1214 in a HARQ-ACK codebook 1220 based on the configuration of the PDCCH candidate 1212 and the counter and/or total DAI values comprised in the PDCCH candidate 1214. Moreover, the terminal device 120 may reserve an additional HARQ-ACK information field 1224 at the end of the HARQ-ACK codebook 1220 for the PDCCH candidate 1214. For example, the value of the HARQ-ACK information field 1224 in this case may be NACK.

In FIG. 12B, it is assumed that the PDCCH candidates 1212 and 1214 are configured for same PDSCH scheduling. In case that the PDCCH candidate 1214 is successfully detected but the PDCCH candidate 1212 is missed or unsuccessfully detected, if the total DAI value in the PDCCH candidate 1214 is same as any of the PDCCH candidates 1211 and 1213 detected in the same PDCCH monitoring occasion as the PDCCH candidate 1212, the terminal device 120 may reserve an additional HARQ-ACK information field 1224 at the end of the HARQ-ACK codebook 1220 for the PDCCH candidate 1214 and indicate HARQ-ACK information for the PDCCH candidate 1214 in the reserved HARQ-ACK information field 1224. For example, in this case, the value of the HARQ-ACK information field 1224 may be NACK.

In FIG. 12C, it is assumed that the PDCCH candidates 1212 and 1214 are configured for different scheduling. In case that the PDCCH candidate 1214 is successfully detected but the PDCCH candidate 1212 is missed or unsuccessfully detected, if the total DAI value in the PDCCH candidate 1214 is different from all of the PDCCH candidates 1211 and 1213 detected in the same PDCCH monitoring occasion as the PDCCH candidate 1212, the terminal device 120 may reserve an additional HARQ-ACK information field 1224 at the end of the HARQ-ACK codebook 1220 for the PDCCH candidate 1214 and indicate HARQ-ACK information for the PDCCH candidate 1214 in the reserved HARQ-ACK information field 1224. For example, in this case, the value of the HARQ-ACK information field 1224 may be NACK.

In some embodiments, PDCCH candidates A and B may be configured for same PDSCH scheduling and the HARQ-ACK codebook may comprise two separate HARQ-ACK information fields for the PDSCH or SPS PDSCH release scheduled by the two PDCCH candidates A and B. In some embodiments, the HARQ-ACK codebook may be generated based on the decoding result of PDSCH and the decoding result(s) of PDCCH in corresponding PDCCH candidate(s). For example, it is assumed that HARQ-ACK information field E is used for the PDSCH or SPS PDSCH release scheduled by DCI in the PDCCH candidate A and HARQ-ACK information field F is used for the PDSCH or SPS PDSCH release scheduled by DCI in the PDCCH candidate B. The value of the HARQ-ACK information field E may be determined based on the decoding result of the PDSCH and the decoding result of DCI in the PDCCH candidate A. The value of the HARQ-ACK information field F may be determined based on the decoding result of the PDSCH and the decoding result of DCI in the PDCCH candidate B. For example, if TB or the scheduled PDSCH is not successfully decoded, and/or if both of the PDCCH candidates A and B are missed or unsuccessfully decoded, both of the HARQ-ACK information fields E and F may have a value of NACK. If TB or the scheduled PDSCH is successfully decoded and if the PDCCH candidate A is successfully detected but the PDCCH candidate B is missed or unsuccessfully detected, the HARQ-ACK information field E may have a value of ACK while the HARQ-ACK information field F may have a value of NACK. If TB or the scheduled PDSCH is successfully decoded and if the PDCCH candidate B is successfully detected but the PDCCH candidate A is missed or unsuccessfully detected, the HARQ-ACK information field F may have a value of ACK while the HARQ-ACK information field E may have a value of NACK.

Figure 13:
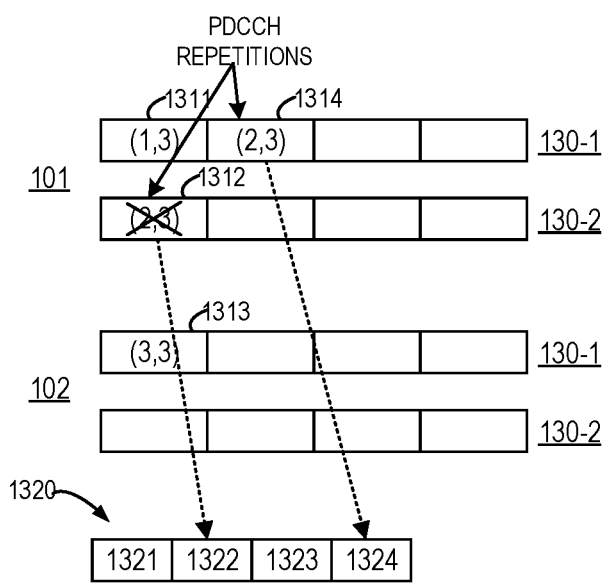
FIG. 13 illustrates an example of embodiments of the present disclosure.

FIG. 13 illustrates an example of such embodiments. FIG. 13 shows PDCCH candidates 1311, 1312 ... 1314. Each of the PDCCH candidates 1311, 1312 ... 1314 comprises a pair of counter DAI value c and total DAI value t, represented as (c, t), where c and t are both integers, for example, $1 \leq c \leq 4$ and $1 \leq t \leq 4$. In FIG. 13, it is assumed that the PDCCH candidates 1312 and 1314 are configured for same PDSCH scheduling. The terminal device 120 may generate a HARQ-ACK codebook 1320 comprising HARQ-ACK information fields 1322 and 1324 corresponding to the PDCCH candidates 1312 and 1314 respectively. For example, as shown in FIG. 13, if the PDCCH candidate 1312 is missed or unsuccessfully detected by the terminal device 120, the value of the HARQ-ACK information field 1322 may be NACK. If the PDCCH candidate 1314 is successfully detected by the terminal device 120 and the PDSCH or TB scheduled by the PDCCH candidate 1314 is successfully decoded by the terminal device 120, the value of the HARQ-ACK information field 1322 may be ACK.

In some embodiments, the N PDCCH candidates configured for same PDSCH scheduling may comprise L PDCCH candidates acting as reference PDCCH candidates and N−L PDCCH candidates acting as non-reference PDCCH candidates, where L is an integer and $1 \leq L \leq N$, for example, L=1. The HARQ-ACK codebook for the PDSCH or SPS PDSCH release scheduled by DCI in the N PDCCH candidates may include HARQ-ACK information fields corresponding to the L reference PDCCH candidates. That is, the HARQ-ACK information field for the PDSCH or SPS PDSCH release scheduled by DCI in any of the N−L non-reference PDCCH candidates may be the same as the HARQ-ACK information field generated for the PDSCH or SPS PDSCH release scheduled by DCI in a corresponding one of the L reference PDCCH candidates. In other words, for the PDSCH or SPS PDSCH release scheduled by any of the N−L PDCCH candidates in a search space and/or CORESET, the HARQ-ACK information field may be generated based on timing information (e.g., start and/or end symbols of the PDCCH monitoring occasion) of a corresponding one of the L reference PDCCH candidates in an associated/linked search space and/or CORESET as well as the counter and/or total DAI values. In some embodiments, the N PDCCH candidates configured for same PDSCH scheduling may share a same counter DAI value and a same total DAI value. In some embodiments, the L reference PDCCH candidates may include the first PDCCH candidate, or a PDCCH candidate (e.g., the first one) in the first linked search space and/or CORESET. Alternatively, the L reference PDCCH candidates may include the last PDCCH candidate, or a PDCCH candidate (e.g., the last one) in the last linked search space and/or CORESET. Alternatively, the L reference PDCCH candidates may include a configured PDCCH candidate, or a PDCCH candidate configured on a search space and/or CORESET (e.g., via any of RRC signaling, MAC CE and DCI).

In some embodiments, the N PDCCH candidates configured for same PDSCH scheduling may all contribute to determination of counter DAI values and total DAI values for PDCCH candidates.

In some embodiments, if N PDCCH candidates are configured for same PDSCH scheduling based on the configuration about search space(s), CORESET(s) and/or the association/linkage among the N PDCCH candidates, the HARQ-ACK codebook may be generated based on the configuration of the L reference PDCCH candidates and their counter and/or total DAI values. For example, if PDCCH candidates A and B are configured for same PDSCH scheduling, the PDCCH candidates A and B may share a same counter DAI value and a same total DAI value. For example, both of the PDCCH candidates A and B may contribute to the counting of counter DAI values and total DAI values for PDCCH candidates. The HARQ-ACK codebook for the PDSCH or SPS PDSCH release scheduled at least one of the PDCCH candidates A and B may be generated based on the counter and/or total DAI values as well as the configuration of the PDCCH candidate A. For example, the configuration of the PDCCH candidate A may indicate at least one of a search space, a CORESET, a serving cell index and CORESETPoolIndex configured for the PDCCH candidate A. For example, the HARQ-ACK codebook may be generated with considering the counter and/or total DAI values in the PDCCH candidate B.

Figure 14:
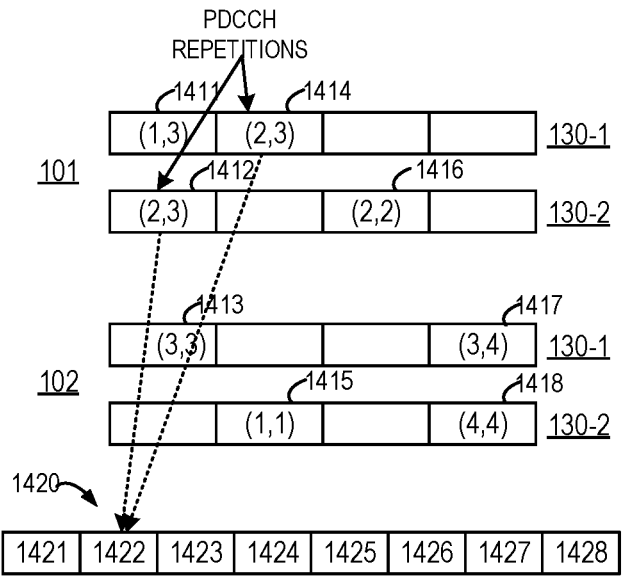
FIG. 14 illustrates an example of embodiments of the present disclosure.

FIG. 14 illustrates an example of such embodiments. FIG. 14 shows PDCCH candidates 1411, 1412 ... 1418. Each of the PDCCH candidates 1411, 1412 ... 1418 comprises a pair of counter DAI value c and total DAI value t, represented as (c, t), where c and t are both integers, for example, $1 \leq c \leq 4$ and $1 \leq t \leq 4$. In FIG. 14, it is assumed that the PDCCH candidates 1412 and 1414 are configured for same PDSCH scheduling, that is, linked as PDCCH repetitions. For example, both of the PDCCH candidates 1412 and 1414 will contribute to the counting of counter DAI values and total DAI values for the PDCCH candidates 1411~1418. In this case, the PDCCH candidate 1414 may comprise a pair of counter and total DAI values (4, 1). However, since the PDCCH candidates 1412 and 1414 are linked as PDCCH repetitions, the payload of the PDCCH candidate 1414 should be the same as that of the PDCCH candidate 1412. Thus, as shown in FIG. 14, the pair of counter and total DAI values (4, 1) comprised in the PDCCH candidate 1414 is replaced with the pair of counter and total DAI values (2, 3) comprised in the PDCCH candidate 1412. The terminal device 120 may generate a HARQ-ACK codebook 1420 comprising a HARQ-ACK information field 1422 corresponding to the PDCCH candidates 1412 and 1414 based on the pair of counter and total DAI values (2, 3) as well as the configuration of the PDCCH candidate 1412. Moreover, the terminal device 120 may reserve an additional HARQ-ACK information field 1423 for the replaced pair of counter and total DAI values (4, 1).

In some embodiments, the N PDCCH candidates configured for same PDSCH scheduling may comprise L PDCCH candidates acting as reference PDCCH candidates and N−L PDCCH candidates acting as non-reference PDCCH candidates, where L is an integer and $1 \leq L \leq N$, for example, L=1. The HARQ-ACK codebook for the PDSCH or SPS PDSCH release scheduled by DCI in the N PDCCH candidates may include HARQ-ACK information fields corresponding to the L reference PDCCH candidates. That is, the HARQ-ACK information field for the PDSCH or SPS PDSCH release scheduled by DCI in any of the N−L non-reference PDCCH candidates may be the same as the HARQ-ACK information field generated for the PDSCH or SPS PDSCH release scheduled by DCI in a corresponding one of the L reference PDCCH candidates. In other words, for the PDSCH or SPS PDSCH release scheduled by any of the N−L PDCCH candidates in a search space and/or CORESET, the HARQ-ACK information field may be generated based on timing information (e.g., start and/or end symbols of the PDCCH monitoring occasion) of a corresponding one of the L reference PDCCH candidates in an associated/linked search space and/or CORESET as well as the counter and/or total DAI values.

In some embodiments, the N PDCCH candidates configured for same PDSCH scheduling may share a same counter DAI value and a same total DAI value. In some embodiments, the L reference PDCCH candidates may include the first PDCCH candidate, or a PDCCH candidate (e.g., the first one) in the first linked search space and/or CORESET. Alternatively, the L reference PDCCH candidates may include the last PDCCH candidate, or a PDCCH candidate (e.g., the last one) in the last linked search space and/or CORESET. Alternatively, the L reference PDCCH candidates may include a configured PDCCH candidate, or a PDCCH candidate configured on a search space and/or CORESET (e.g., via any of RRC signaling, MAC CE and DCI).

In some embodiments, counter and/or total DAI values for the N PDCCH candidates may be counted separately from other PDCCH candidates. Alternatively or in addition, HARQ-ACK information fields for the N PDCCH candidates may be generated separately. For example, it is assumed that there may be other K PDCCH repetitions each of which is different from all of the N PDCCH candidates and the HARQ-ACK information for the PDSCH or SPS PDSCH release scheduled by the K PDCCH candidates is in a same PUCCH and/or a same slot/sub-slot as the HARQ-ACK information for the PDSCH or SPS PDSCH release scheduled by the N PDCCH candidates. In some embodiments, counter and/or total DAI values for the K PDCCH candidates are counted separately from those for the N PDCCH candidates. In some embodiments, the HARQ-ACK codebook (e.g., HARQ-ACK codebook 2) for the N PDCCH candidates may be generated separately from the HARQ-ACK codebook (e.g., HARQ-ACK codebook 1) for the K PDCCH candidates. For example, the HARQ-ACK codebook 2 can be appended to or multiplexed after the HARQ-ACK codebook 1. For another example, the HARQ-ACK codebook 2 can be multiplexed before the HARQ-ACK codebook 1. In some embodiments, the counter DAI value may be the accumulated number of sets of PDCCH repetitions, and/or the total DAI value may be the total number of sets of sets of PDCCH repetitions if the total DAI field exists.

In some embodiments, the N PDCCH candidates configured for same PDSCH scheduling may comprise L PDCCH candidates acting as reference PDCCH candidates and N−L PDCCH candidates acting as non-reference PDCCH candidates, where L is an integer and $1 \leq L \leq N$, for example, L=1. The HARQ-ACK information fields for the PDSCH or SPS PDSCH release scheduled by DCI in the N PDCCH candidates may be determined based on the L reference PDCCH candidates. That is, the HARQ-ACK information field for the PDSCH or SPS PDSCH release scheduled by DCI in any of the N−L non-reference PDCCH candidates may be the same as the HARQ-ACK information field generated for the PDSCH or SPS PDSCH release scheduled by DCI in a corresponding one of the L reference PDCCH candidates. For example, the L reference PDCCH candidates may contribute to determination of counter DAI values and total DAI values for PDCCH candidates, while the N−L non-reference PDCCH candidates may contribute nothing to the determination of counter DAI values and total DAI values for PDCCH candidates.

Figure 15A:
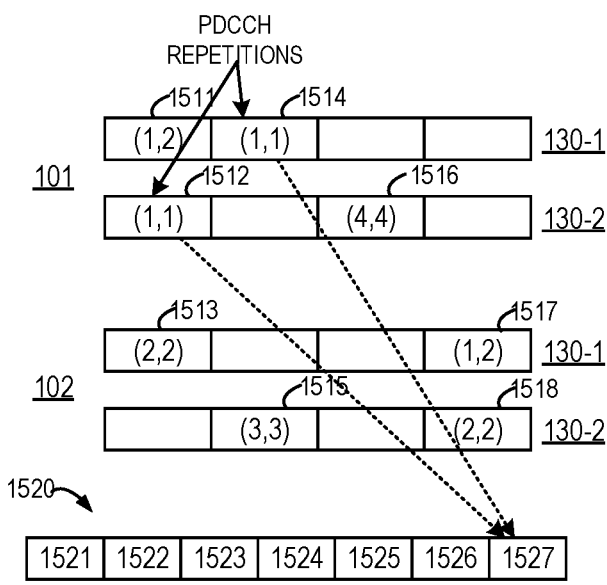
FIGS. 15A-15B illustrate examples of embodiments of the present disclosure.
Figure 15B:
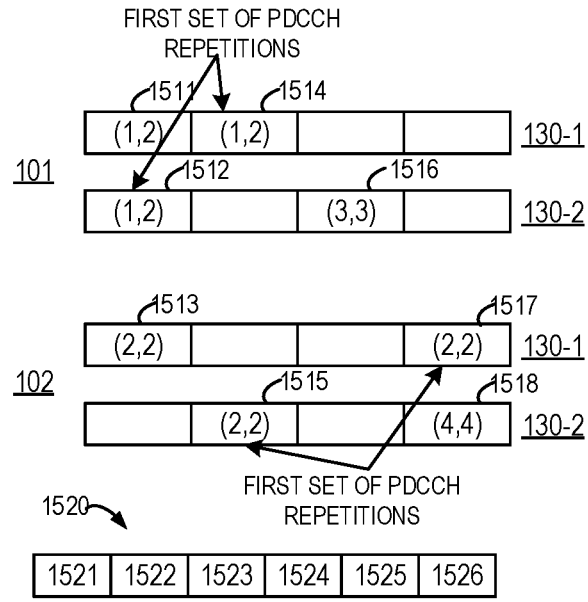

FIGS. 15A and 15B illustrate examples of such embodiments. FIGS. 15A and 15B show PDCCH candidates 1511, 1512 . . . 1518. Each of the PDCCH candidates 1511, 1512 . . . 1518 comprises a pair of counter DAI value c and total DAI value t, represented as (c, t), where c and t are both integers, for example, $1 \leq c \leq 4$ and $1 \leq t \leq 4$.

In FIG. 15A, it is assumed that the PDCCH candidates 1512 and 1514 are configured for same PDSCH scheduling, that is, linked as PDCCH repetitions. Each of the PDCCH candidates 1511 and 1513~1518 is configured for different scheduling from the PDCCH candidates 1512 and 1514. The terminal device 120 may generate a HARQ-ACK codebook (e.g., HARQ-ACK codebook 1) for the PDCCH candidates 1511 and 1513~1518, which may comprise HARQ-ACK information fields 1521~1527. The terminal device 120 may generate a separate HARQ-ACK codebook (e.g., HARQ-ACK codebook 2) for the PDCCH repetitions 1512 and 1514, which may comprise a HARQ-ACK information field 1528. The terminal device 120 may append the HARQ-ACK codebook generated for the PDCCH repetitions 1512 and 1514 after the HARQ-ACK codebook generated for the PDCCH candidates 1511 and 1513~1518, so as to obtain the HARQ-ACK codebook 1520 shown in FIG. 15A.

In FIG. 15B, it is assumed that the PDCCH candidates 1512 and 1514 are configured for same PDSCH scheduling, that is, linked as a first set of PDCCH repetitions. The PDCCH candidates 1515 and 1517 are configured for same PDSCH scheduling, that is, linked as a second set of PDCCH repetitions. Each of the PDCCH candidates 1511, 1513, 1516 and 1518 is configured for different scheduling from the PDCCH candidates 1512, 1514, 1515 and 1517. The terminal device 120 may generate a HARQ-ACK codebook (e.g., HARQ-ACK codebook 1) for the PDCCH candidates 1511, 1513, 1516 and 1518, which may comprise HARQ-ACK information fields 1521~1524. The terminal device 120 may generate a separate HARQ-ACK codebook (e.g., HARQ-ACK codebook 2) for the first set of PDCCH repetitions 1512 and 1514, which may comprise a HARQ-ACK information field 1525. The terminal device 120 may generate a separate HARQ-ACK codebook (e.g., HARQ-ACK codebook 2) for the second set of PDCCH repetitions 1515 and 1517, which may comprise a HARQ-ACK information field 1526. The terminal device 120 may append the HARQ-ACK codebook generated for the first set of PDCCH repetitions 1512 and 1514 and the HARQ-ACK codebook generated for the second set of PDCCH repetitions 1515 and 1517 after the HARQ-ACK codebook generated for the PDCCH candidates 1511, 1513, 1516 and 1518, so as to obtain the HARQ-ACK codebook 1520 shown in FIG. 15B.

In some embodiments, the HARQ-ACK information field in the HARQ-ACK codebook for the PDSCH or SPS PDSCH release scheduled by the N1 PDCCH candidates (e.g. for same PDSCH scheduling) may be generated based on the PDCCH monitoring occasion for the N1 PDCCH candidates and the counter and/or total DAI values of N1 PDCCH candidates. The HARQ-ACK information field for the PDSCH or SPS PDSCH release scheduled by N−N1 PDCCH candidates (e.g., in an associated search space and/or CORESET) may be reserved, which can be appended to the HARQ-ACK codebook.

For example, it is assumed that there may be other K PDCCH repetitions each of which is different from all of the N PDCCH candidates and the HARQ-ACK information for the PDSCH or SPS PDSCH release scheduled by the K PDCCH candidates is in a same PUCCH and/or a same slot/sub-slot as the HARQ-ACK information for the PDSCH or SPS PDSCH release scheduled by the N PDCCH candidates. In some embodiments, the HARQ-ACK information field for the PDSCH or SPS PDSCH release scheduled by N−N1 PDCCH candidates may be reserved and appended to the HARQ-ACK codebook generated for the PDSCH or SPS PDSCH release scheduled by the N1 and K PDCCH candidates.

Figure 16:
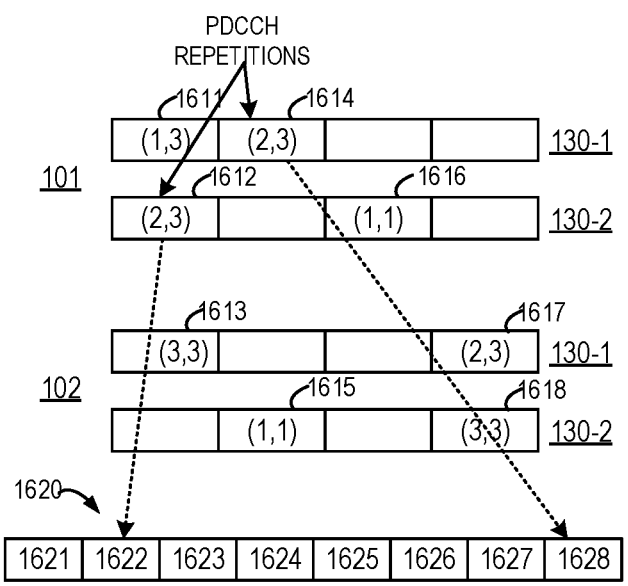
FIG. 16 illustrates an example of embodiments of the present disclosure.

FIG. 16 illustrates an example of such embodiments. FIG. 16 shows PDCCH candidates 1611, 1612 ... 1618. Each of the PDCCH candidates 1611, 1612 ... 1618 comprises a pair of counter DAI value c and total DAI value t, represented as (c, t), where c and t are both integers, for example, $1 \leq c \leq 4$ and $1 \leq t \leq 4$. In FIG. 16, it is assumed that the PDCCH candidates 1612 and 1614 are configured for same PDSCH scheduling, that is, linked as PDCCH repetitions. The terminal device 120 may generate a HARQ-ACK codebook 1620 comprising HARQ-ACK information fields 1621~1627 corresponding to the PDCCH candidates 1611~1613 and 1615~1618. For example, the HARQ-ACK information field 1622 corresponding to the PDCCH candidate 1612 can be determined based on the configuration of the PDCCH candidate 1612, e.g., the counter and/or total DAI values comprises in the PDCCH candidate 1612. The terminal device 120 may reserve a HARQ-ACK information field 1628 corresponding to the PDCCH candidate 1614 in an associated search space and/or CORESET. The terminal device 120 may append the HARQ-ACK information field 1628 to the HARQ-ACK codebook 1620 generated for the PDCCH candidates 1611~1613 and 1615~1618, so as to obtain the HARQ-ACK codebook 1620 as shown in FIG. 16.

In some embodiments, for PDCCH in N−N1 PDCCH candidates (in an associated search space, CORESET and/or configured with TCI state B), the cyclic redundancy check (CRC) code for the PDCCH may be scrambled with a specific Radio Network Temporary Identity (RNTI) value (e.g., a different RNTI value from that used for PDCCH in N1 PDCCH candidates) or the DMRS sequence of the PDCCH may be generated based on a specific initialization value (e.g., a different initialization value from that used for PDCCH in N1 PDCCH candidates).

As described above, in the 3GPP meeting RAN1 #98-99, it has been proposed to support PDCCH repetitions to improve reliability and robustness for the PDCCH. That is, DCI can be repeatedly transmitted from a network device to a terminal device more than once, so as to improve reliability and robustness for the PDCCH.

In order to support PDCCH repetitions, several further problems need to be solved. For example, DCI transmitted via the PDCCH can be used for scheduling PDSCH transmission to a terminal device, triggering transmission of an aperiodic Channel State Information-Reference Signal (A-CSI-RS) to a terminal device, indicating a time/frequency resource for an aperiodic ZP CSI-RS, scheduling PUSCH transmission from a terminal device, triggering transmission of an aperiodic Sounding Reference Signal (SRS) from a terminal device, triggering transmission of an aperiodic Channel State Information (CSI) report from a terminal device, or triggering a Hybrid Automatic Repeat Request (HARQ) feedback from a terminal device. However, if PDCCH repetitions are enabled, it is unclear how to provide the offset indication for the PDSCH transmission to a terminal device, the transmission of the A-CSI-RS to a terminal device, the indication of the time/frequency resource for the aperiodic ZP CSI-RS to a terminal device, the PUSCH transmission from a terminal device, the transmission of the aperiodic SRS from a terminal device, the transmission of the aperiodic CSI report from a terminal device or the HARQ feedback from a terminal device. Further, if the combination of PDCCH repetitions is expected, the offset values indicated in different PDCCH repetitions should be the same. However, if the offset values indicated in different PDCCH repetitions are the same, it is unclear how to indicate the real time offset for corresponding channel/signal transmission and/or reception.

Embodiments of the present disclosure provide a solution to solve the problems above and/or one or more of other potential problems. This solution enables both a network device and a terminal device to determine, from the PDCCH repetitions, the real time offset for corresponding transmission scheduled/triggered by the PDCCH repetitions. Since the payloads of different physical channel repetitions are the same, the combination of the physical channel repetitions can be achieved, so as to improve reliability and robustness for the physical channel.

Figure 17:
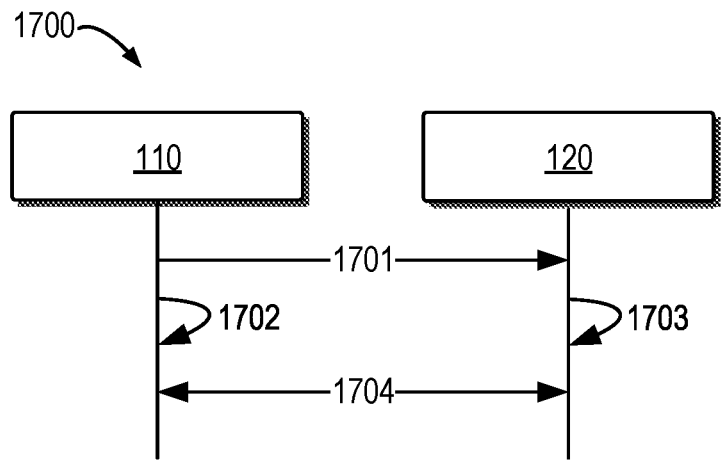
FIG. 17 illustrates a signaling chart of an example process of communication in accordance with some embodiments of the present disclosure.

FIG. 17 illustrates an example signaling chart showing an example process 1700 of communication in accordance with some embodiments of the present disclosure. As shown in FIG. 2, the process 1700 may involve the network device 110 and the terminal device 120 as shown in FIG. 1. It is to be understood that the process 1700 may include additional acts not shown and/or may omit some acts as shown, and the scope of the present disclosure is not limited in this regard.

As shown in FIG. 17, the network device 110 may transmit (1701), to the terminal device 120, DCI over a plurality of PDCCH candidates for scheduling a same communication between the network device 110 and the terminal device 120. In some embodiments, the plurality of PDCCH candidates may include a first set of PDCCH candidates and a second set of PDCCH candidates. For example, the DCI transmitted over the first set of PDCCH candidates may indicate offset information and/or first timing information for the communication. For example, the offset information may indicate an offset value K (where K is a non-negative integer, for example, $0 \leq K \leq 64$) for the communication. For example, the timing information may indicate a scheduling offset between the first set of PDCCH candidates and the communication. Correspondingly, the terminal device 120 may detect (1701) the DCI over the plurality of PDCCH candidates from the network device 110. For example, the DCI may not be detected by the terminal device 120 or may be detected over one or more of the PDCCH candidates. The network device 110 may determine (1702) second timing information for the communication based on a time interval between the first and second sets of PDCCH candidates and at least one of a configuration of the second set of PDCCH candidates, third timing information corresponding to the DCI over the second set of PDCCH candidates, the offset information and the first timing information. In response to the DCI being detected over one of the plurality of PDCCH candidates, the terminal device 120 may determine (1703) second timing information for the communication based on a time interval between the first and second sets of PDCCH candidates and at least one of a first configuration of the second set of PDCCH candidates, third timing information corresponding to the DCI over the second set of PDCCH candidates, the offset information and the first timing information. Then, the communication is performed (1704) between the network device 110 and the terminal device 120 based on the second timing information. In some embodiments, the communication may include communication of at least one of the following: a PDSCH signal, a PUSCH signal, a PUCCH signal, a CSI-RS, an aperiodic CSI-RS, a Zero power (ZP) CSI-RS, an aperiodic ZP CSI-RS, a SRS, an aperiodic SRS, a CSI report, an aperiodic CSI report, a HARQ feedback (ACK or NACK), and so on.

In some embodiments, the network device 110 may transmit, to the terminal device 120, a configuration indicative of N PDCCH candidates associated/linked with each other, for example, 2≤N≤8. For example, the N PDCCH candidates are configured for scheduling at least one of same PDSCH, same data or same transport block(s), same PUSCH, same uplink data, same downlink data, same uplink transport block(s), same downlink transport block(s), same aperiodic CSI-RS transmission/reception, same aperiodic SRS transmission/reception, same PUCCH, same CSI feedback. For example, the configuration may be transmitted via any of RRC signaling, MAC CE and DCI.

In some embodiments, the N PDCCH candidates may be comprised in one search space. In some embodiments, the search space may be associated with one CORESET, which may be configured with two TCI states X and Y. For example, N1 PDCCH candidates (where N1 is an integer and 1≤N1≤N) may be configured with TCI state X and (N−N1) PDCCH candidates may be configured with TCI state Y. Alternatively, in some embodiments, the search space may be associated with two CORESETs. For example, N1 PDCCH candidates (where N1 is an integer and 1≤N1≤N) may be associated with a first CORESET and (N−N1) PDCCH candidates may be associated with a second CORESET. In some embodiments, the N1 PDCCH candidates may be represented as the second set of PDCCH candidates. In some embodiments, the N−N1 PDCCH candidates may be represented as the first set of PDCCH candidates.

In some embodiments, the N PDCCH candidates may be comprises in two search spaces associated with each other. For example, N1 PDCCH candidates (where N1 is an integer and 1≤N1≤N) may be associated with a first search space and (N−N1) PDCCH candidates may be associated with a second search space. In some embodiments, the two search spaces may be associated with one CORESET. Alternatively, in some embodiments, the two search spaces may be associated with two CORESETs respectively. In some embodiments, the N1 PDCCH candidates may be represented as the second set of PDCCH candidates. In some embodiments, the N−N1 PDCCH candidates may be represented as the first set of PDCCH candidates.

In some embodiments, the N PDCCH candidates configured for scheduling the same communication may comprise L PDCCH candidates acting as reference PDCCH candidates and N−L PDCCH candidates acting as non-reference PDCCH candidates, where L is an integer and 1≤L≤N, for example, L=1. For example, the N PDCCH candidates configured for scheduling the same communication may comprise PDCCH candidates A and B, where the PDCCH candidate A acts as a reference PDCCH candidate and the PDCCH candidate B acts as a non-reference PDCCH candidate.

In some embodiments, the scheduling offset for the communication (e.g., PDSCH, PUSCH, PUCCH, CSI-RS, SRS communication and so on) scheduled by PDCCH in the PDCCH candidate A and/or the timing for applying a configuration (e.g., TPC command) indicated/configured by PDCCH in the PDCCH candidate A may be determined based on timing information about the PDCCH candidate A and the same offset value K. For example, the timing information about the PDCCH candidate A may indicate at least one of the following: a slot of the PDCCH in the PDCCH candidate A; a sub-slot of the PDCCH in the PDCCH candidate A; a start symbol of the PDCCH in the PDCCH candidate A; an end symbol of the PDCCH in the PDCCH candidate A; a start symbol of a search space, a CORESET or a monitoring occasion for the PDCCH candidate A; and an end symbol of the search space, the CORESET or the monitoring occasion for the PDCCH candidate A.

In some embodiments, the DCI transmitted over PDCCH candidate B may indicate an offset information for the communication. For example, the DCI in the PDCCH candidate B may indicate an offset value K (where K is a non-negative integer, for example, 0≤K≤64) for the communication. In some embodiments, the scheduling offset for the communication (e.g., PDSCH, PUSCH, PUCCH, CSI-RS, SRS communication and so on) scheduled by PDCCH in the PDCCH candidate B and/or the timing for applying a configuration (e.g., TPC command) indicated/configured by PDCCH in the PDCCH candidate B may be determined based on timing information about the PDCCH candidate A and the offset value K. Alternatively, in some embodiments, the scheduling offset for the communication (e.g., PDSCH, PUSCH, PUCCH, CSI-RS, SRS communication and so on) scheduled by PDCCH in the PDCCH candidate B and/or the timing for applying a configuration (e.g., TPC command) indicated/configured by PDCCH in the PDCCH candidate B may be determined based on timing information about the PDCCH candidate B, the offset value K and a time difference between the PDCCH candidate A and the PDCCH candidate B. Alternatively, in some embodiments, the scheduling offset for the communication (e.g., PDSCH, PUSCH, PUCCH, CSI-RS, SRS communication and so on) scheduled by PDCCH in the PDCCH candidate B and/or the timing for applying a configuration (e.g., TPC command) indicated/configured by PDCCH in the PDCCH candidate B may be determined based on the time interval or the time difference between the PDCCH candidate A and the PDCCH candidate B, and the offset value K. For example, the timing information about the PDCCH candidate B may indicate at least one of the following: a start symbol of the PDCCH in the PDCCH candidate B; an end symbol of the PDCCH in the PDCCH candidate B; a start symbol of a search space, a CORESET or a monitoring occasion for the PDCCH candidate B; and an end symbol of the search space, the CORESET or the monitoring occasion for the PDCCH candidate B. For example, the time interval or the time difference between the PDCCH candidate A and the PDCCH candidate B may indicate the number of slots, sub-slots, or symbols between the start or end symbol of PDCCH/search space/CORESET/monitoring occasion related to the PDCCH candidate A and the start or end symbol of PDCCH/search space/CORESET/monitoring occasion related to the PDCCH candidate B.

Figure 18:
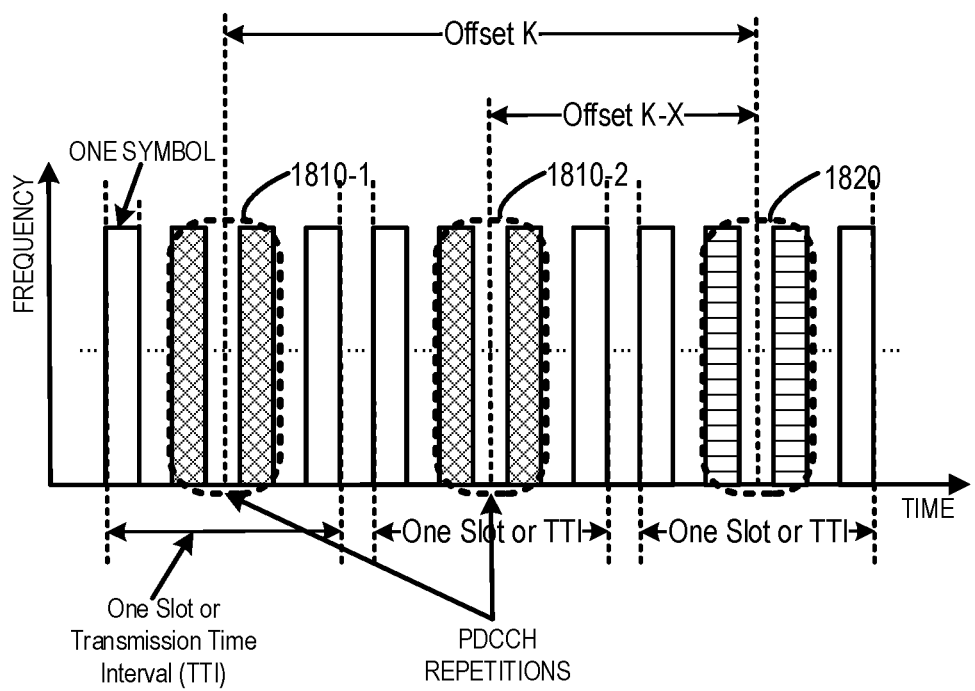
FIG. 18 illustrates an example of embodiments of the present disclosure.

FIG. 18 illustrates an example of such embodiments. As shown in FIG. 18, PDCCH candidates 1810-1 and 1810-2 may be configured for scheduling a communication 1820. For example, the PDCCH candidate 1810-1 may act as a reference PDCCH candidate while the PDCCH candidate 1810-2 may act as a non-reference PDCCH candidate. For example, DCI transmitted over the PDCCH candidates 1810-1 and 1810-2 may indicate a same offset value K. In some embodiments, if the terminal device 120 detects PDCCH over the PDCCH candidate 1810-1, the terminal device 120 may determine the scheduling offset for the communication 1820 based on the timing information about the PDCCH candidate 1810-1 and the offset value K. In some embodiments, if the terminal device 120 detects PDCCH over the PDCCH candidate 1810-2, the terminal device 120 may determine the scheduling offset for the communication 1820 based on the timing information about the PDCCH candidate 1810-1 and the offset value K, or based on the timing information about the PDCCH candidate 1810-2, a time difference X between the PDCCH candidates 1810-1 and 1810-2 and the offset value K. The time difference X may indicate the number of slots, sub-slots, or symbols between the start or end symbol of PDCCH/search space/CORESET/monitoring occasion related to the PDCCH candidate 1810-1 and the start or end symbol of PDCCH/search space/CORESET/monitoring occasion related to the PDCCH candidate 1820-2.

In some embodiments, the network device 110 may transmit, to the terminal device 120, a configuration indicative of a first set of PDCCH candidates (or PDCCH candidate B) associated/linked with a second set of PDCCH candidates (or PDCCH candidate A). For example, the first set and second set of PDCCH candidates are configured for scheduling at least one of same PDSCH, same data or same transport block(s), same PUSCH, same uplink data, same downlink data, same uplink transport block(s), same downlink transport block(s), same aperiodic CSI-RS transmission/reception, same aperiodic SRS transmission/reception, same PUCCH, same CSI feedback. For example, the configuration may be transmitted via any of RRC signaling, MAC CE and DCI.

In some embodiments, the first set of PDCCH candidates are different from the second set of PDCCH candidates. In some embodiments, PDCCH candidate A is different from PDCCH candidate B.

In some embodiments, the DCI in the first set of PDCCH candidates (or PDCCH candidate B) may include at least one of a value of counter DAI, a value of total DAI, an offset value K. In some embodiments, the DCI in the second set of PDCCH candidates (or PDCCH candidate A) may include at least one of a value of counter DAI, a value of total DAI, an offset value K. In some embodiments, there may be a timing related to the DCI in the second set of PDCCH candidates (or PDCCH candidate A).

In some embodiments, the DCI in the first set of PDCCH candidates (or PDCCH candidate B) may be for scheduling a communication. In some embodiments, the communication may include communication of at least one of the following: a PDSCH, a PUSCH, a PUCCH, a CSI-RS, an aperiodic CSI-RS, a Zero power (ZP) CSI-RS, an aperiodic ZP CSI-RS, a SRS, an aperiodic SRS, a CSI report, an aperiodic CSI report, a HARQ feedback (ACK or NACK), a power control information, a transmit power control (TPC) information and so on.

In some embodiments, the HARQ-ACK codebook for the PDSCH or SPS PDSCH release scheduled by DCI in the first set of PDCCH candidates (or PDCCH candidate B) may be generated based on the configuration of the second set of PDCCH candidates (or PDCCH candidate A) and at least one of the counter DAI value and the total DAI value. In some embodiments, configuration of the second set of PDCCH candidates (or PDCCH candidate A) may be at least one of the slot index, sub-slot index, symbol index, start symbol, start symbol index, end symbol, end symbol index and number of symbols of PDCCH/search space/CORESET/monitoring occasion related to the second set of PDCCH candidates (or PDCCH candidate A).

In some embodiments, the timing for the communication scheduled by the DCI in the first set of PDCCH candidates (or PDCCH candidate B) may be determined the timing for the communication based on the time interval between the first set of PDCCH candidates (or PDCCH candidate B) and the second set of PDCCH candidates (or PDCCH candidate A) and the offset K. In some embodiments, the time interval between the first set of PDCCH candidates (or PDCCH candidate B) and the second set of PDCCH candidates (or PDCCH candidate A) may be at least one of the number of slots, sub-slots, or symbols between the start or end symbol of PDCCH/search space/CORESET/monitoring occasion related to the first set of PDCCH candidates (or PDCCH candidate B) and the start or end symbol of PDCCH/search space/CORESET/monitoring occasion related to the second set of PDCCH candidates (or PDCCH candidate A).

Figure 19:
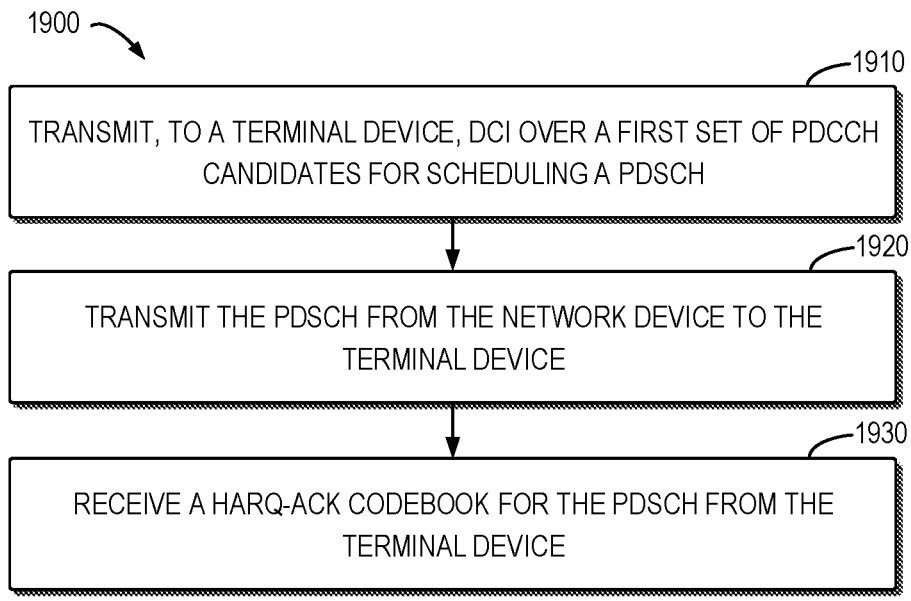
FIG. 19 illustrates a flowchart of an example method in accordance with some embodiments of the present disclosure.

FIG. 19 illustrates a flowchart of an example method 1900 in accordance with some embodiments of the present disclosure. The method 1900 can be performed at the network device 110 as shown in FIG. 1 and/or FIG. 2. It is to be understood that the method 1900 may include additional blocks not shown and/or may omit some blocks as shown, and the scope of the present disclosure is not limited in this regard.

At block 1910, the network device 110 transmits, to the terminal device 120, DCI over a first set of PDCCH candidates for scheduling a PDSCH, where the DCI includes at least one of a counter DAI value and a total DAI value.

At block 1920, the network device 110 transmits the PDSCH to the terminal device.

At block 1930, the network device 110 receives a HARQ-ACK codebook for the PDSCH from the terminal device, where the HARQ-ACK codebook is generated at least based on a first configuration of a second set of PDCCH candidates, and at least one of the counter DAI value and the total DAI value.

In some embodiments, the DCI over the first set of PDCCH candidates and the DCI over the second set of PDCCH candidates may be used for same PDSCH scheduling. Alternatively or in addition, the counter DAI value in the DCI over the first set of PDCCH candidates and the counter DAI value in the DCI over the second set of PDCCH candidates may be the same. Alternatively or in addition, the total DAI value in the DCI over the first set of PDCCH candidates and the total DAI value in the DCI over the second set of PDCCH candidates may be the same.

In some embodiments, the network device 110 may transmit, to the terminal device 120, a second configuration indicative of an association between the first and second sets of PDCCH candidates.

In some embodiments, the first configuration may indicate at least one of a search space, a CORESET, a serving cell, a slot index, a symbol index, a number of symbols, a start symbol index, and a CORESET pool configured for the second set of PDCCH candidates.

In some embodiments, the second set of PDCCH candidates may contribute to determination of at least one of counter DAI values and total DAI values for PDCCH candidates, and the first set of PDCCH candidates may contribute nothing to the determination of at least one of counter DAI values and total DAI values for PDCCH candidates.

In some embodiments, each PDCCH candidate of the first and second sets of PDCCH candidates may contribute to determination of at least one of counter DAI values and total DAI values for PDCCH candidates.

Figure 20:
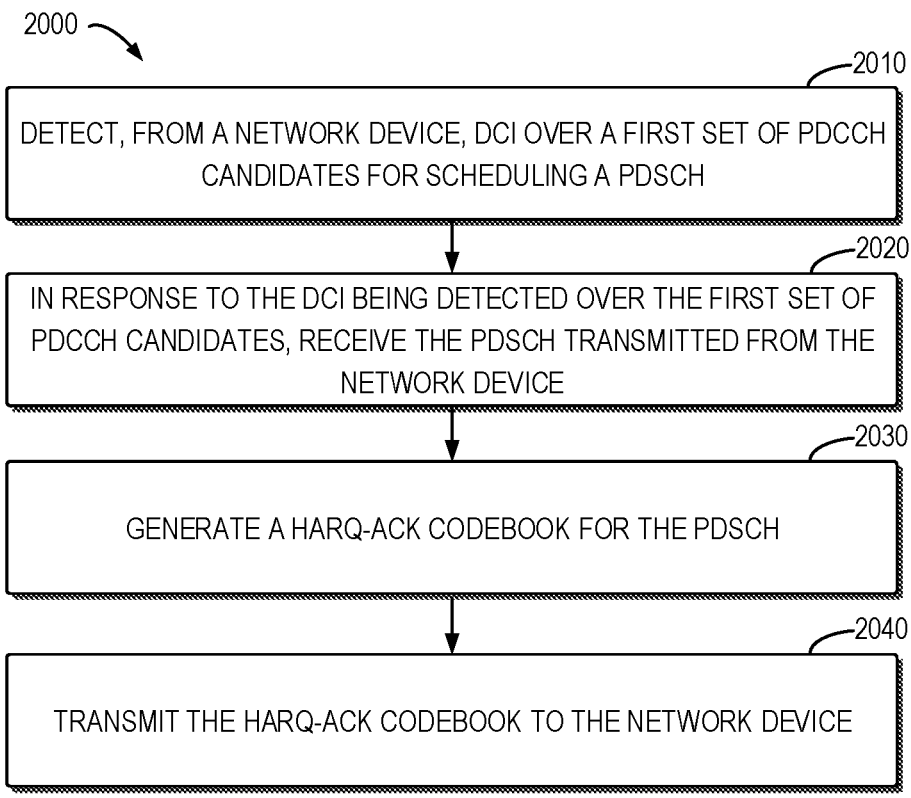
FIG. 20 illustrates a flowchart of an example method in accordance with some embodiments of the present disclosure.

FIG. 20 illustrates a flowchart of an example method 2000 in accordance with some embodiments of the present disclosure. The method 2000 can be performed at the terminal device 120 as shown in FIG. 1 and/or FIG. 2. It is to be understood that the method 2000 may include additional blocks not shown and/or may omit some blocks as shown, and the scope of the present disclosure is not limited in this regard.

At block 2010, the terminal device 120 detects, from the network device 110, DCI over a first set of PDCCH candidates for scheduling a PDSCH, where the DCI includes at least one of a counter DAI value and a total DAI value.

At block 2020, in response to the DCI being detected over the first set of PDCCH candidates, the terminal device 120 receives the PDSCH transmitted from the network device 110.

At block 2030, the terminal device 120 generates a HARQ-ACK codebook for the PDSCH, based on a first configuration of a second set of PDCCH candidates, and at least one of the counter DAI value and the total DAI value.

At block 2040, the terminal device 120 transmits the HARQ-ACK codebook to the network device 110.

In some embodiments, the DCI over the first set of PDCCH candidates and the DCI over the second set of PDCCH candidates may be used for same PDSCH scheduling. Alternatively or in addition, the counter DAI value in the DCI over the first set of PDCCH candidates and the counter DAI value in the DCI over the second set of PDCCH candidates may be the same. Alternatively or in addition, the total DAI value in the DCI over the first set of PDCCH candidates and the total DAI value in the DCI over the second set of PDCCH candidates may be the same.

In some embodiments, the terminal device 120 may receive, from the network device 110, a second configuration indicative of an association between the first and second sets of PDCCH candidates.

In some embodiments, the first configuration may indicate at least one of a search space, a CORESET, a serving cell, a slot index, a symbol index, a number of symbols, a start symbol index, and a CORESET pool configured for the second set of PDCCH candidates.

In some embodiments, the second set of PDCCH candidates may contribute to determination of at least one of counter DAI values and total DAI values for PDCCH candidates, and the first set of PDCCH candidates may contribute nothing to the determination of at least one of counter DAI values and total DAI values for PDCCH candidates.

In some embodiments, each PDCCH candidate of the first and second sets of PDCCH candidates may contribute to determination of at least one of counter DAI values and total DAI values for PDCCH candidates.

In some embodiments, the network device 110 may generate the HARQ-ACK codebook by determining, based on the first configuration of the second set of PDCCH candidates and at least one of the counter DAI value and the total DAI value, a HARQ-ACK information field corresponding to the first set of PDCCH candidates in the HARQ-ACK codebook; and in response to the DCI being detected over at least one of the first set of PDCCH candidates and the second set of PDCCH candidates, indicating a result of decoding the PDSCH in the HARQ-ACK information field.

In some embodiments, the network device 110 may generate the HARQ-ACK codebook by in response to failing to detect the DCI over the first set of PDCCH candidates and the second set of PDCCH candidates, indicating a negative acknowledgement in the HARQ-ACK information field.

In some embodiments, the network device 110 may generate the HARQ-ACK codebook by determining, based on at least one of the first configuration of the second set of PDCCH candidates, the counter DAI value and the total DAI value, a first HARQ-ACK information field corresponding to the second set of PDCCH candidates in the HARQ-ACK codebook; determining, based on at least one of the counter DAI value and total DAI value, a second HARQ-ACK information field corresponding to the first set of PDCCH candidates in the HARQ-ACK codebook; in response to the DCI being detected over the second set of PDCCH candidates, indicating a result of decoding the PDSCH in the first HARQ-ACK information field; and in response to the DCI being detected over the first set of PDCCH candidates, indicating a result of decoding the PDSCH in the second HARQ-ACK information field.

In some embodiments, the network device 110 may generate the HARQ-ACK codebook by in response to failing to detect the DCI over the second set of PDCCH candidates, indicating a negative acknowledgement in the first HARQ-ACK information field; and in response to failing to detect the DCI over the first set of PDCCH candidates, indicating a negative acknowledgement in the second HARQ-ACK information field.

In some embodiments, the counter DAI value in the DCI over at least one of the first and second sets of PDCCH candidates may be the accumulative number of a third set of PDCCH candidates up to a current PDCCH monitoring occasion. Alternatively or in addition, the total DAI value in the DCI over at least one of the first and second sets of PDCCH candidates may be the total number of the third set of PDCCH candidates up to the current PDCCH monitoring occasion. Alternatively or in addition, the third set of PDCCH candidates may include the first and second sets of PDCCH candidates.

Figure 21:
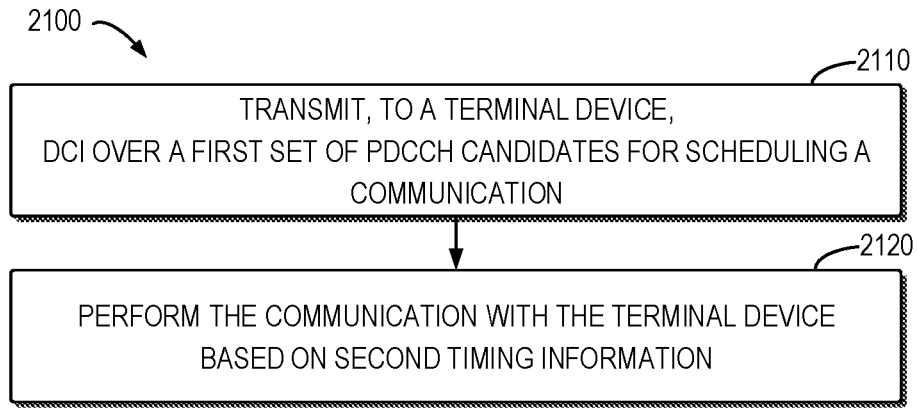
FIG. 21 illustrates a flowchart of an example method in accordance with some embodiments of the present disclosure.

FIG. 21 illustrates a flowchart of an example method 2100 in accordance with some embodiments of the present disclosure. The method 2100 can be performed at the network device 110 as shown in FIG. 1 and/or FIG. 17. It is to be understood that the method 2100 may include additional blocks not shown and/or may omit some blocks as shown, and the scope of the present disclosure is not limited in this regard.

At block 2110, the network device 110 transmits, to the terminal device 120, DCI over a first set of PDCCH candidates for scheduling a communication between the network device 110 and the terminal device 120, where the DCI includes at least one of offset information for the communication and first timing information for the communication.

At block 2120, the network device 110 performs the communication with the terminal device 120 based on second timing information, where the second timing information is determined based on a time interval between the first set of PDCCH candidates and a second set of PDCCH candidates and at least one of a first configuration of the second set of PDCCH candidates, third timing information corresponding to the DCI over the second set of PDCCH candidates, the offset information, and the first timing information.

In some embodiments, the DCI over the first set of PDCCH candidates and the DCI over the second set of PDCCH candidates may be used for scheduling the same communication. Alternatively or in addition, the offset information in the DCI over the first set of PDCCH candidates and the offset information in the DCI over the second set of PDCCH candidates may be the same.

In some embodiments, the network device 110 may transmit, to the terminal device 120, a second configuration indicative of an association between the first and second sets of PDCCH candidates.

In some embodiments, the first configuration may indicate at least one of a search space, a CORESET, a serving cell, a slot index, a symbol index, a number of symbols, a start symbol index, and a CORESET pool configured for the second set of PDCCH candidates.

In some embodiments, the third timing information may indicate at least one of the following: a slot for transmitting the DCI over the second set of PDCCH candidates; a sub-slot for transmitting the DCI over the second set of PDCCH candidates; a start symbol for transmitting the DCI over the second set of PDCCH candidates; an end symbol for transmitting the DCI over the second set of PDCCH candidates; a start symbol of a search space, a CORESET or a monitoring occasion for the second set of PDCCH candidates; and an end symbol of the search space, the CORESET or the monitoring occasion for the second set of PDCCH candidates.

Figure 22:
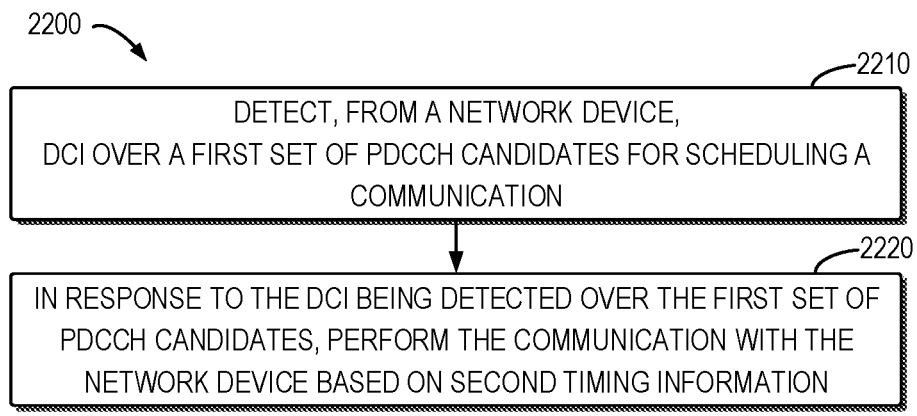
FIG. 22 illustrates a flowchart of an example method in accordance with some embodiments of the present disclosure.

FIG. 22 illustrates a flowchart of an example method 2200 in accordance with some embodiments of the present disclosure. The method 2200 can be performed at the terminal device 120 as shown in FIG. 1 and/or FIG. 17. It is to be understood that the method 2200 may include additional blocks not shown and/or may omit some blocks as shown, and the scope of the present disclosure is not limited in this regard.

At block 2210, the terminal device 120 detects, from the network device 110, DCI over a first set of PDCCH candidates for scheduling a communication between the network device and the terminal device 120, where the DCI includes at least one of offset information for the communication and first timing information for the communication.

At block 2220, in response to the DCI being detected over the first set of PDCCH candidates, the terminal device 120 performs the communication with the network device 110 based on second timing information, where the second timing information is determined based on a time interval between the first set of PDCCH candidates and a second set of PDCCH candidates and at least one of a first configuration of the second set of PDCCH candidates, third timing information corresponding to the DCI over the second set of PDCCH candidates, the offset information, and the first timing information.

In some embodiments, the DCI over the first set of PDCCH candidates and the DCI over the second set of PDCCH candidates may be used for scheduling the same communication. Alternatively or in addition, the offset information in the DCI over the first set of PDCCH candidates and the offset information in the DCI over the second set of PDCCH candidates may be the same.

In some embodiments, the terminal device 120 may receive, from the network device 110, a second configuration indicative of an association between the first and second sets of PDCCH candidates.

In some embodiments, the first configuration may indicate at least one of a search space, a CORESET, a serving cell, a slot index, a symbol index, a number of symbols, a start symbol index, and a CORESET pool configured for the second set of PDCCH candidates.

In some embodiments, the third timing information may indicate at least one of the following: a slot for transmitting the DCI over the second set of PDCCH candidates; a sub-slot for transmitting the DCI over the second set of PDCCH candidates; a start symbol for transmitting the DCI over the second set of PDCCH candidates; an end symbol for transmitting the DCI over the second set of PDCCH candidates; a start symbol of a search space, a CORESET or a monitoring occasion for the second set of PDCCH candidates; and an end symbol of the search space, the CORESET or the monitoring occasion for the second set of PDCCH candidates.

Figure 23:
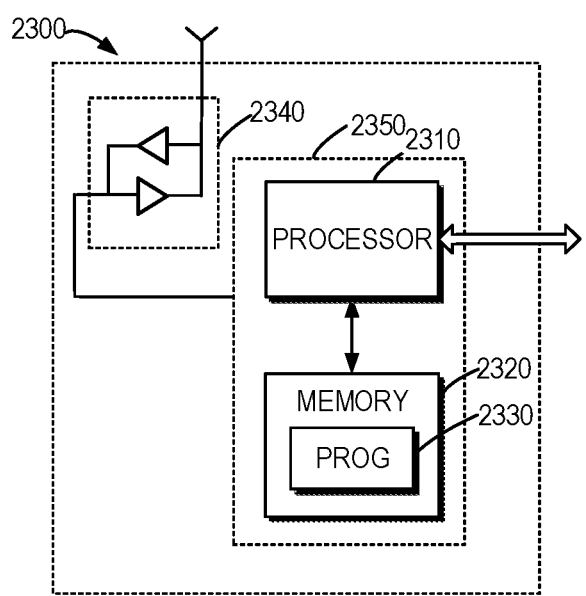
FIG. 23 is a simplified block diagram of a device that is suitable for implementing embodiments of the present disclosure.

FIG. 23 is a simplified block diagram of a device 2300 that is suitable for implementing embodiments of the present disclosure. The device 2300 can be considered as a further example implementation of the network device 110, the terminal device 120 and/or the TRP 130 as shown in FIG. 1. Accordingly, the device 2300 can be implemented at or as at least a part of the network device 110, the terminal device 120 and/or the TRP 130 as shown in FIG. 1.

As shown, the device 2300 includes a processor 2310, a memory 2320 coupled to the processor 2310, a suitable transmitter (TX) and receiver (RX) 2340 coupled to the processor 2310, and a communication interface coupled to the TX/RX 2340. The memory 2310 stores at least a part of a program 2330. The TX/RX 2340 is for bidirectional communications. The TX/RX 2340 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 2330 is assumed to include program instructions that, when executed by the associated processor 2310, enable the device 2300 to operate in accordance with the embodiments of the present disclosure, as discussed herein with reference to FIGS. 1 to 22. The embodiments herein may be implemented by computer software executable by the processor 2310 of the device 2300, or by hardware, or by a combination of software and hardware. The processor 2310 may be configured to implement various embodiments of the present disclosure. Furthermore, a combination of the processor 2310 and memory 2320 may form processing means 2350 adapted to implement various embodiments of the present disclosure.

The memory 2320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 2320 is shown in the device 2300, there may be several physically distinct memory modules in the device 2300. The processor 2310 may be of any type suitable to the local technical network, and may include one or more of general purpose computers, special purpose computers, microprocessors, digital signal processors (DSPs) and processors based on multicore processor architecture, as non-limiting examples. The device 2300 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 19, 20, 21 and/or 22. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:
    receiving, from a network device, two Physical Downlink Control Channel (PDCCH) candidates comprising a first PDCCH candidate and a second PDCCH candidate, the first PDCCH candidate and the second PDCCH candidate are linked to PDCCH repetition;
    determining a hybrid automatic repeat request acknowledgement (HARQ-ACK) codebook based on a starting time of the first PDCCH candidate,
        wherein the first PDCCH candidate is earlier than the second PDCCH candidate; and
    transmitting, to the network device, HARQ-ACK information based on the HARQ-ACK codebook.

2. The method of claim 1, wherein the determining the HARQ-ACK codebook comprises:
    determining the HARQ-ACK codebook based on the starting time and at least one of a counter downlink assignment indicator (DAI) value and a total DAI value,
    wherein the counter DAI value and the total DAI value are detected over at least one of the first PDCCH candidate and the second PDCCH candidate.

3. The method of claim 2, wherein:
    a counter DAI value detected over the first PDCCH candidate and a counter DAI value detected over the second PDCCH candidate are the same; and/or
    a total DAI value detected over the first PDCCH candidate and a total DAI value detected over the second PDCCH candidate are the same.

4. The method of claim 2, wherein the counter DAI value detected over at least one of the first PDCCH candidate and the second PDCCH candidate is an accumulative number related to a PDCCH monitoring occasion,
    wherein the total DAI value detected over at least one of the first PDCCH candidate and the second PDCCH candidate is a total number of a set of PDCCH monitoring occasions, and
    wherein the set of PDCCH monitoring occasions includes the PDCCH monitoring occasion.

5. The method of claim 1, the method further comprising:
    receiving, from the network device, a Physical Downlink Shared Channel (PDSCH) scheduled over the two PDCCH candidates;
    wherein determining the HARQ-ACK codebook comprises:
        determining the HARQ-ACK codebook for the PDSCH.

6. The method of claim 1, the method further comprising:
    receiving, from the network device, a configuration indicating the first PDCCH candidate and the second PDCCH candidate, which are linked to the PDCCH repetition.

7. The method of claim 1, wherein the starting time is based on a start symbol or a start slot.

8. The method of claim 1, wherein the determining the HARQ-ACK codebook comprises:
   determining a HARQ-ACK information field in the HARQ-ACK codebook, and
   wherein the HARQ-ACK information is indicated in the HARQ-ACK information field.

9. A method performed by a network device, the method comprising:
   transmitting, to a terminal device, two Physical Downlink Control Channel (PDCCH) candidates comprising a first PDCCH candidate and a second PDCCH candidate, the first PDCCH candidate and the second PDCCH candidate are linked to PDCCH repetition; and
   receiving hybrid automatic repeat request acknowledgement (HARQ-ACK) information based on a HARQ-ACK codebook from the terminal device,
   wherein the HARQ-ACK codebook is determined based on a starting time of the first PDCCH candidate, and
   wherein the first PDCCH candidate is earlier than the second PDCCH candidate.

10. The method of claim 9, wherein the HARQ-ACK codebook is determined further based on at least one of a counter downlink assignment indicator (DAI) value and a total DAI value, and
   wherein the counter DAI value and the total DAI value are indicated over at least one of the first PDCCH candidate and the second PDCCH candidate.

11. The method of claim 10, wherein:
   a counter DAI value indicated over the first PDCCH candidate and a counter DAI value indicated over the second PDCCH candidate are the same; and/or
   a total DAI value indicated over the first PDCCH candidate and a total DAI value indicated over the second PDCCH candidate are the same.

12. The method of claim 9, the method further comprising:
   transmitting, to the terminal device, a Physical Downlink Shared Channel (PDSCH) over the two PDCCH candidates,
   wherein the HARQ-ACK codebook is determined for the PDSCH.

13. The method of claim 9, the method further comprising:
   transmitting, to the terminal device, a configuration indicating the first PDCCH candidate and the second PDCCH candidate, which are linked to the PDCCH repetition.

14. The method of claim 9, wherein the starting time is based on a start symbol or a start slot.

15. A terminal device, comprising:
   a processor configured to cause the terminal device to:
      receive, from a network device, two Physical Downlink Control Channel (PDCCH) candidates comprising a first PDCCH candidate and a second PDCCH candidate, the first PDCCH candidate and the second PDCCH candidate are linked to PDCCH repetition;
      determine a hybrid automatic repeat request acknowledgement (HARQ-ACK) codebook based on a starting time of the first PDCCH candidate,
         wherein the first PDCCH candidate is earlier than the second PDCCH candidate; and
      transmit, to the network device, HARQ-ACK information based on the HARQ-ACK codebook.

16. The terminal device of claim 15, wherein the processor is further configured to cause the terminal device to:
   determine the HARQ-ACK codebook based on the starting time and at least one of a counter downlink assignment indicator (DAI) value and a total DAI value, and
   wherein the counter DAI value and the total DAI value are detected over at least one of the first PDCCH candidate and the second PDCCH candidate.

17. The terminal device of claim 15, wherein the processor is further configured to cause the terminal device to:
   receive, from the network device, a Physical Downlink Shared Channel (PDSCH) scheduled over the two PDCCH candidates, and
   wherein the HARQ-ACK codebook is determined for the PDSCH.

18. The terminal device of claim 15, wherein:
   a counter DAI value detected over the first PDCCH candidate and a counter DAI value detected over the second PDCCH candidate are the same; and/or
   a total DAI value detected over the first PDCCH candidate and a total DAI value detected over the second PDCCH candidate are the same.

19. The terminal device of claim 15, wherein the processor is further configured to cause the terminal device to:
   receive, from the network device, a configuration indicating the first PDCCH candidate and the second PDCCH candidate, which are linked to the PDCCH repetition.

20. The terminal device of claim 15, wherein the starting time is based on a start symbol or a start slot.

* * * * *